(12) United States Patent
Chandra et al.

(10) Patent No.: US 8,953,644 B2
(45) Date of Patent: Feb. 10, 2015

(54) MULTI-PROTOCOL I/O INTERCONNECT TIME SYNCHRONIZATION

(75) Inventors: Prashant R. Chandra, Santa Clara, CA (US); Vladimir Yudovich, Haifa (IL); Eran Galil, Haifa (IL); Efraim Kugman, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/338,236

(22) Filed: Dec. 27, 2011

(65) Prior Publication Data
US 2013/0163617 A1   Jun. 27, 2013

(51) Int. Cl.
*H04J 3/06* (2006.01)
*H04L 7/00* (2006.01)

(52) U.S. Cl.
CPC .......................................... *H04L 7/00* (2013.01)
USPC .......................................................... 370/503

(58) Field of Classification Search
CPC .............. H04L 21/2684; H04L 43/106; H04L 2463/121; H04L 27/2646; H04L 25/03006; H04L 2025/03445; H04L 2025/03547; H04L 7/00; H01H 43/00; H01H 43/04; G04G 3/02; G04G 3/022; G04G 3/025; G04G 3/027; G06F 1/12; G06F 5/06; H04J 3/06
USPC .......................................................... 370/503
See application file for complete search history.

(56) References Cited

U.S. PATENT DOCUMENTS

| | | | |
|---|---|---|---|
| 4,767,168 A | 8/1988 | Grandy | |
| 4,969,924 A | 11/1990 | Suverison et al. | |
| 5,242,315 A | 9/1993 | O'Dea | |
| 5,267,337 A | 11/1993 | Kirma | |
| 5,419,717 A | 5/1995 | Abendschein et al. | |
| 5,535,036 A | 7/1996 | Grant | |
| 6,108,782 A | 8/2000 | Flectcher et al. | |
| 6,272,551 B1 | 8/2001 | Martin et al. | |
| 6,478,625 B2 | 11/2002 | Tolmie et al. | |
| 6,536,670 B1 | 3/2003 | Postman et al. | |
| 6,549,966 B1 | 4/2003 | Dickens et al. | |
| 6,588,938 B1 | 7/2003 | Lampert et al. | |

(Continued)

FOREIGN PATENT DOCUMENTS

| | | |
|---|---|---|
| JP | 04-138677 A | 5/1992 |
| JP | 06-334687 A | 12/1994 |

(Continued)

OTHER PUBLICATIONS

Office Action mailed Feb. 5, 2014 for Korean Application No. 2013-0014284, 3 pages.

(Continued)

*Primary Examiner* — Melvin Marcelo
*Assistant Examiner* — Ellen A Kirlloa
(74) *Attorney, Agent, or Firm* — Schwabe Williamson & Wyatt PC

(57) ABSTRACT

Described are embodiments of methods, apparatuses, and systems for time synchronization of a multi-protocol I/O interconnect of computer apparatus. A method for synchronizing time across the multi-protocol I/O interconnect may include providing a first local time of a first switch of a switching fabric of a multi-protocol interconnect to a second switch of the switching fabric, and adjusting a second local time of the second switch to the first local time. Other embodiments may be described and claimed.

14 Claims, 29 Drawing Sheets

(56) References Cited

U.S. PATENT DOCUMENTS

| | | |
|---|---|---|
| 6,751,238 B1 | 6/2004 | Lipp et al. |
| 6,839,771 B1 | 1/2005 | Bouchier et al. |
| 7,002,996 B1 | 2/2006 | Dougherty et al. |
| 7,023,356 B2* | 4/2006 | Burkhardt et al. ............ 340/8.1 |
| 7,069,369 B2 | 6/2006 | Chou et al. |
| 7,081,023 B2 | 7/2006 | Zhang et al. |
| 7,095,927 B2 | 8/2006 | Yamada et al. |
| 7,184,440 B1 | 2/2007 | Sterne et al. |
| 7,330,468 B1 | 2/2008 | Tse-Au |
| 7,613,212 B1* | 11/2009 | Raz et al. ..................... 370/510 |
| 7,646,981 B2 | 1/2010 | Coffey |
| 8,051,217 B2 | 11/2011 | Goodart et al. |
| 8,644,352 B1* | 2/2014 | Hutchison et al. ........... 370/509 |
| 2002/0049862 A1 | 4/2002 | Gladney et al. |
| 2002/0160656 A1 | 10/2002 | Nishita |
| 2003/0126319 A1 | 7/2003 | Adusumilli et al. |
| 2003/0179711 A1 | 9/2003 | Huff |
| 2003/0208652 A1 | 11/2003 | Kuhlmann et al. |
| 2004/0246996 A1 | 12/2004 | Engel |
| 2005/0102682 A1 | 5/2005 | Shah et al. |
| 2005/0281286 A1 | 12/2005 | Wang et al. |
| 2005/0283549 A1 | 12/2005 | Gibson et al. |
| 2006/0064522 A1 | 3/2006 | Weigold et al. |
| 2006/0203851 A1* | 9/2006 | Eidson ......................... 370/503 |
| 2007/0005867 A1 | 1/2007 | Diamant |
| 2007/0249193 A1 | 10/2007 | Penumatcha et al. |
| 2007/0297799 A1 | 12/2007 | Tse-Au |
| 2008/0025289 A1 | 1/2008 | Kapur et al. |
| 2008/0028120 A1 | 1/2008 | McLeod |
| 2008/0062980 A1 | 3/2008 | Sunaga et al. |
| 2008/0069150 A1 | 3/2008 | Badt et al. |
| 2008/0150645 A1* | 6/2008 | McCorquodale et al. 331/117 R |
| 2009/0028495 A1 | 1/2009 | Anrig et al. |
| 2009/0106430 A1 | 4/2009 | Matters et al. |
| 2009/0172185 A1 | 7/2009 | Chandra et al. |
| 2010/0049885 A1 | 2/2010 | Chandra et al. |
| 2010/0085989 A1 | 4/2010 | Belhadj et al. |
| 2010/0135314 A1 | 6/2010 | Fourcand |
| 2010/0211834 A1 | 8/2010 | Asnaashari et al. |
| 2011/0052199 A1* | 3/2011 | Beshai ............................ 398/82 |
| 2011/0150005 A1* | 6/2011 | Chen et al. ................... 370/503 |
| 2011/0182274 A1 | 7/2011 | Lam et al. |
| 2012/0030495 A1* | 2/2012 | Chandhoke et al. .......... 713/400 |

FOREIGN PATENT DOCUMENTS

| | | | |
|---|---|---|---|
| JP | 10-233820 | A | 9/1998 |
| JP | 10-243016 | A | 9/1998 |
| JP | 2001-168380 | A | 6/2001 |
| JP | 2001-358733 | A | 12/2001 |
| JP | 2002-190344 | A | 7/2002 |
| JP | 2006-115362 | A | 4/2006 |
| KR | 1020010076079 | A | 8/2001 |
| TW | I249313 | | 2/2006 |
| WO | 2009085494 | A | 7/2009 |
| WO | 2010021844 | A | 2/2010 |

OTHER PUBLICATIONS

Office Action mailed Jan. 30, 2014 for Chinese Application No. 200980136965.0, 15 pages.
International Search Report & Written Opinion for PCT/US2008/084621, mailed May 18, 2009.
International Preliminary Report on Patentability for PCT/US2008/084621, mailed Jul. 8, 2010.
International Preliminary Report on Patentability for PCT/US2009/052831, mailed Mar. 3, 2011.
International Search Report & Written Opinion for PCT/US2012/067438 mailed Mar. 11, 2013.
International Search Report & Written Opinion for PCT/US2012/067439, mailed May 5, 2013.
International Search Report & Written Opinion for PCT/US2012/067393 mailed Mar. 8, 2013.
Non-final Office Action for U.S. Appl. No. 12/229,453 mailed Jun. 23, 2010.
Non-final Office Action for U.S. Appl. No. 11/964,666 mailed Aug. 11, 2010.
Non-final Office Action for U.S. Appl. No. 12/229,453 mailed Dec. 29, 2010.
Final Office Action for U.S. Appl. No. 11/964,666 mailed Jan. 24, 2011.
Non-final Office Action for U.S. Appl. No. 12/229,453 mailed Jun. 15, 2011.
Final Office Action for U.S. Appl. No. 12/229,453 mailed Nov. 7, 2011.
Non-final Office Action for U.S. Appl. No. 12/229,453 mailed Mar. 28, 2012.
Final Office Action for U.S. Appl. No. 12/229,453 mailed Oct. 10, 2012.
Notice of Allowability for U.S. Appl. No. 11/964,666 mailed Nov. 23, 2012.
Advisory Action for U.S. Appl. No. 12/229,453 mailed Dec. 13, 2012.
Notice of Allowability for U.S. Appl. No. 11/964,666 mailed Apr. 12, 2012.
Office Action and Search Report for TW 97147418, mailed Jun. 14, 2012.
Office Action and Search Report issued for Taiwan Application No. 97147418, mailed Nov. 22, 2012.
Search Report for Taiwan Application No. 98127253, mailed Nov. 8, 2012.
Office Action for Korean Application No. 10-2010-7016587, mailed Jul. 11, 2011.
Office Action for Korean Application No. 10-2010-7016587, mailed Apr. 26, 2012.
Office Action for Korean Application No. 10-2011-7003986, mailed Jul. 18, 2012.
Office action for Japanese Application No. 2010-540703, mailed Nov. 22, 2011.
Office Action for JP 2011-523856, mailed Mar. 12, 2013.
Office Action for Chinese Application No. 200880122959.5, mailed Mar. 19, 2012.
Office Action for Chinese Application No. 200880122959.5, mailed Dec. 3, 2012.
Search Report for European Application No. 08868735.5, mailed Sep. 2, 2011.
Office Action for European Application No. 08868735.5, mailed Sep. 29, 2011.
Search Report for European Application No. 09808593.9, mailed Aug. 19, 2011.
Office Action for European Application No. 09808593.9, mailed Sep. 13, 2011.
Office Action for Chinese Application No. 200880122959.5 mailed Mar. 27, 2013.
International Search Report and Written Opinion for PCT/US2009/052831, mailed Mar. 15, 2010.
International Preliminary Report on Patentability for PCT Application No. PCT/US2012/067438, dated Jul. 10, 2014.

* cited by examiner

| CM | Rsvd | Level 6 Port # | R | Level 5 Port # | R | Level 4 Port # | R | Level 3 Port # | R | Level 2 Port # | R | Level 1 Port # | R | Level 0 Port # |
|---|---|---|---|---|---|---|---|---|---|---|---|---|---|---|
| 1 | 9 | 6 | 2 | 6 | 2 | 6 | 2 | 6 | 2 | 6 | 2 | 6 | 2 | 6 |

FIG. 8

| ≥ | Rsvd | Level 6 Port # | R | Level 5 Port # | R | Level 4 Port # | R | Level 3 Port # | R | Level 2 Port # | R | Level 1 Port # | R | Level 0 Port # |
|---|---|---|---|---|---|---|---|---|---|---|---|---|---|---|
| 1 | 9 | 6 | 2 | 6 | 2 | 6 | 2 | 6 | 2 | 6 | 2 | 6 | 2 | 6 |

FIG. 9

MULTI-PROTOCOL I/O INTERCONNECT TIME SYNCHRONIZATION

TECHNICAL FIELD

Embodiments of the present disclosure relate generally to multi-protocol tunneling across a multi-protocol I/O interconnect of a computer apparatus.

BACKGROUND

Conventional computer platform architectures include a variety of host controllers to implement a number of different types of I/O between computer platforms and peripheral devices that are connected to the platforms, and these computer platforms generally include protocol-specific connection interfaces that connect to the peripheral devices via protocol-specific plugs and cables. For example, a computer may include one or more of a USB-specific controller that connects to a peripheral device via a USB-specific connection interface, a display-specific controller (e.g., DisplayPort) that connects to a peripheral device via a display-specific connection interface, a PCI Express®-controller that connects to a peripheral device via a PCI Express®-specific connection interface, and so on.

BRIEF DESCRIPTION OF THE DRAWINGS

Embodiments of the present disclosure will be described by way of example embodiments, but not limitations, illustrated in the accompanying drawings in which like references denote similar elements, and in which:

FIG. 8 describes a format of a route string for routing configuration packets in a domain, in accordance with various embodiments of the present disclosure.

FIG. 9 describes a format of a topology ID configuration register, in accordance with various embodiments of the present disclosure.

DETAILED DESCRIPTION

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Moreover, methods within the scope of this disclosure may include more or fewer steps than those described.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Figure 1:
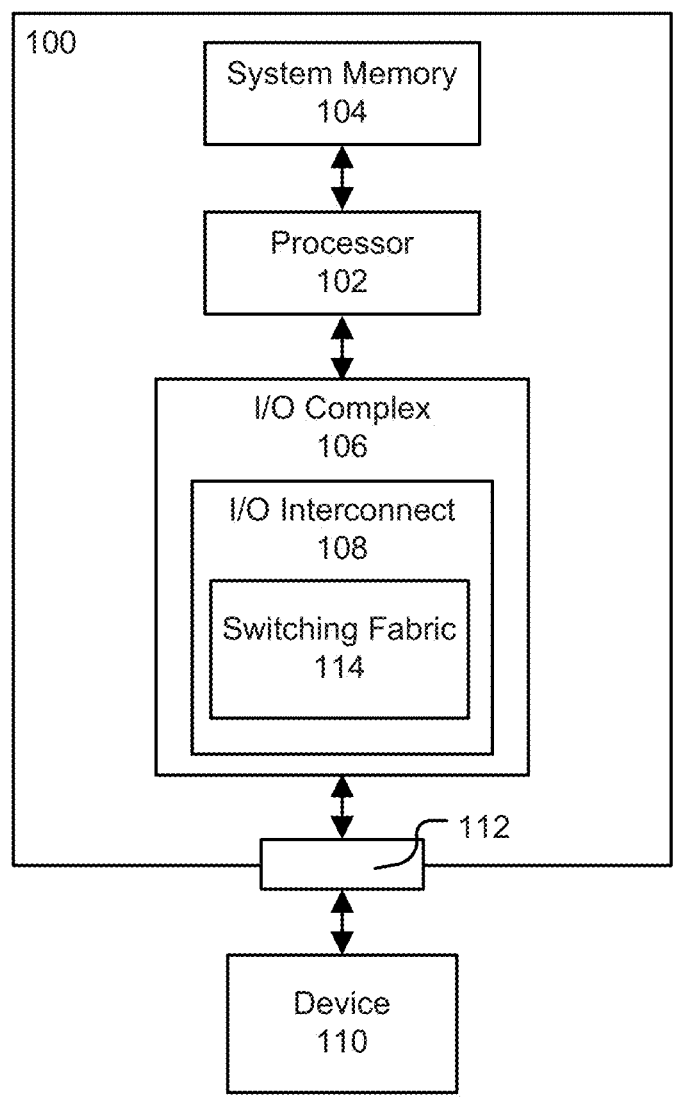
FIG. 1 describes a computer apparatus including a multi-protocol tunneling I/O interconnect, in accordance with various embodiments of the present disclosure.

FIG. 1 describes a computer apparatus 100 including a multi-protocol tunneling I/O interconnect 108 in accordance with various embodiments. In many embodiments, the computer apparatus 100 may include one or more processors 102. In different embodiments, the one or more processors 102 may include one core or multiple cores. In some embodiments, the apparatus 100 may be a multiprocessor system (not shown) where each of the processors has one core or multiple cores.

As shown in FIG. 1, the one or more processors 102 may be operatively coupled to system memory 104 through one or more links (e.g., interconnects, buses, etc). System memory 104 may be capable of storing information that the one or more processors 100 utilize to operate and execute programs and operating systems. In different embodiments, system memory 104 may be any usable type of readable and writeable memory such as a form of dynamic random access memory (DRAM).

In previously implemented computer apparatuses, an I/O link connecting a peripheral device to a computer system is protocol-specific with a protocol-specific connector port that allows a compatible peripheral device to be attached to the protocol-specific connector port (i.e., a USB keyboard device would be plugged into a USB port, a router device would be plugged into a LAN/Ethernet port, etc.) with a protocol-specific cable. Any single connector port would be limited to peripheral devices with a compatible plug and compatible protocol. Once a compatible peripheral device is plugged into the connector port, a communication link would be established between the peripheral device and a protocol-specific controller.

In the computer apparatus as described in the embodiment shown in FIG. 1, the one or more processors 102 may be operatively coupled to an I/O complex 106, which may house one or more multi-protocol I/O interconnects 108 configured to control one or more I/O links that allow the one or more processors 102 to communicate with one or more I/O peripheral devices 110. For providing the multi-protocol capability, at least in part, the I/O interconnect 108 may include a multi-protocol switching fabric 114 configured to carry multiple I/O protocols. In various embodiments, the multi-protocol switching fabric 114 may comprise a plurality of cross-bar switches. Examples of I/O peripheral devices 110 may include a display device, a keyboard device, an expansion port, a desktop or mobile computer system, or a router, among other devices.

A non-protocol-specific connector port 112 may be configured to couple the I/O interconnect 108 with a connector port (not shown) of the device 110, allowing multiple device types to attach to the computer system 100 through a single physical connector port 112. Moreover, the I/O link between the device 110 and the I/O complex 106 may be configured to carry multiple I/O protocols (e.g., PCI Express®, USB, DisplayPort, HDMI®, etc.) simultaneously. In various embodiments, the connector port 112 may be capable of providing the full bandwidth of the link in both directions with no sharing of bandwidth between ports or between upstream and downstream directions. In various embodiments, the connection between the I/O interconnect 108 and the device 110 may support electrical connections, optical connections, or both.

Figure 2:
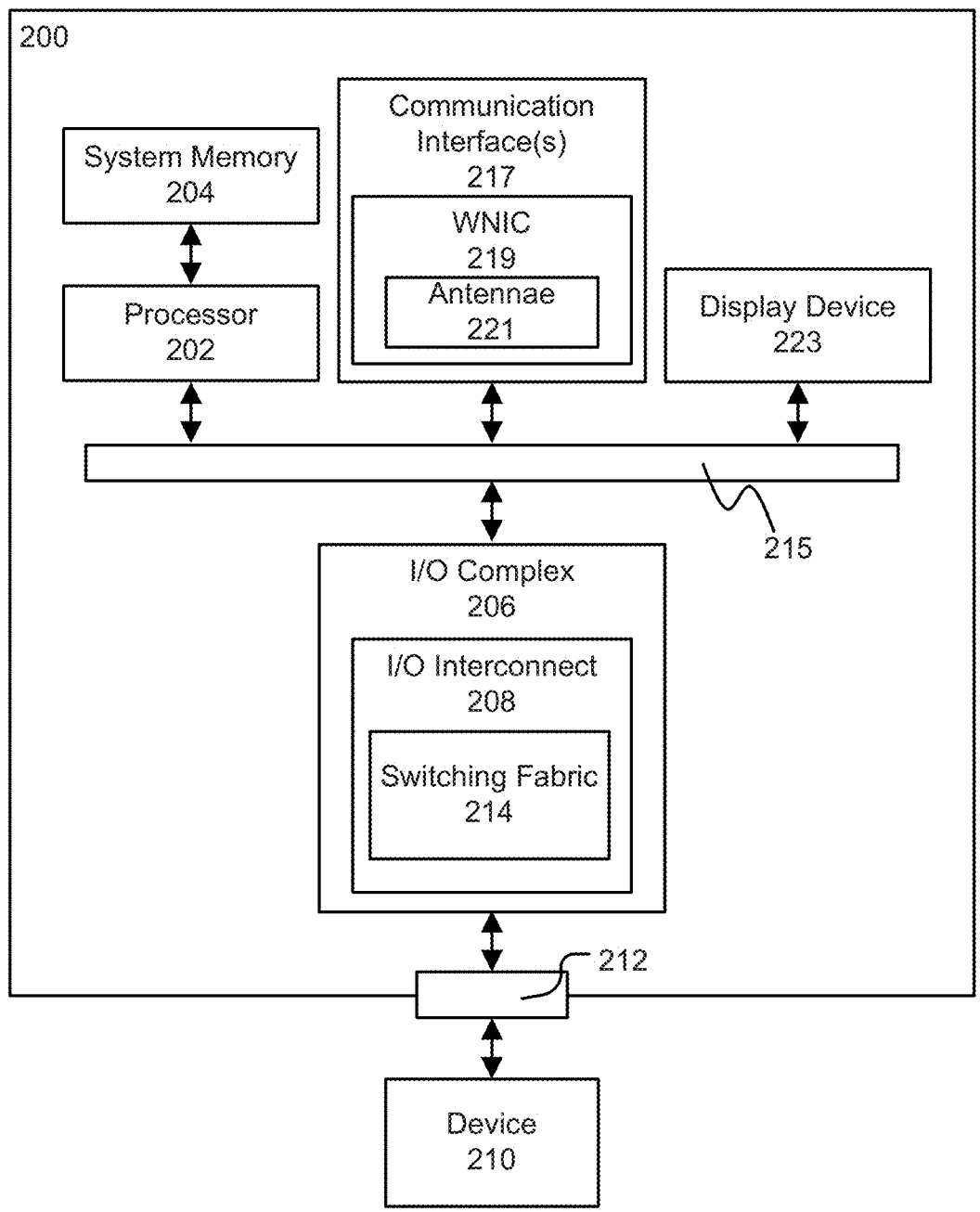
FIG. 2 describes a computer system including a multi-protocol tunneling I/O interconnect, in accordance with various embodiments of the present disclosure.

The apparatus 100 may be a stand-alone device or may be incorporated into various systems including, but not limited to, various computing and/or consumer electronic devices/appliances, such as desktop computing device, a mobile computing device (e.g., a laptop computing device, a handheld computing device, a tablet, a netbook, etc.), mobile phones, smart phones, personal digital assistants, servers, workstations, set-top boxes, digital reorders, game consoles, digital media players, and digital cameras. A block diagram of an example system 200 is illustrated in FIG. 2. The system 200 may comprise one or more processor(s) 202, system memory 204, and an I/O complex 206, all operatively coupled by a bus 115. The I/O complex 206 may include one or more multi-protocol I/O interconnects 208, each of which include a switching fabric 214 and control one or more I/O links that allow the one or more processors 202 to communicate with one or more I/O peripheral devices 210. In various embodiments, the system 200 may have more or fewer components, and/or different architectures.

The system 200 may include communications interface(s) 217 operatively coupled to the bus 215 to provide an interface for system 200 to communicate over one or more networks and/or with any other suitable device. The communications interface(s) 217 may include any suitable hardware and/or firmware. The communications interface(s) 217 for one embodiment may include, for example, a network adapter, a wireless network adapter, a telephone modem, and/or a wireless modem. For wireless communications, the communications interface(s) 217 for one embodiment may include a wireless network interface controller 219 having one or more antennae 221 to establish and maintain a wireless communication link with one or more components of a wireless network. The system 200 may wirelessly communicate with the one or more components of the wireless network in accordance with any of one or more wireless network standards and/or protocols.

The system 100 may include a display device 223, such as, for example, a cathode ray tube (CRT), liquid crystal display (LCD), light emitting diode (LED), or other suitable display device, operatively coupled to the bus 215 for displaying information. In various embodiments, the display device 223 may be a peripheral device interconnected with the system 200. In various ones of these embodiments, such a peripheral display device may be interconnected with the I/O complex 206 by way of the multi-protocol port 212.

Figure 3:
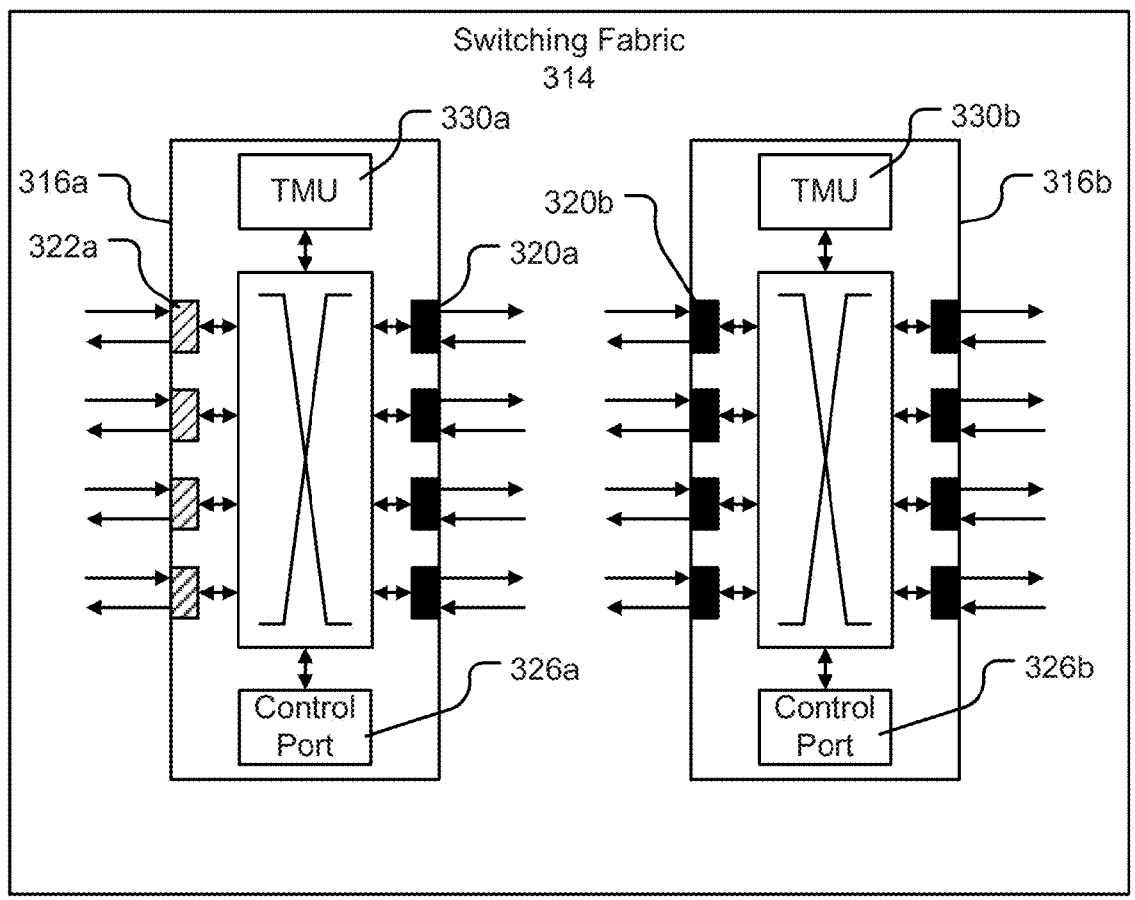
FIG. 3 describes a switching fabric of a multi-protocol tunneling I/O interconnect, in accordance with various embodiments of the present disclosure.

As described herein, for providing an I/O interconnect capable of carrying multiple I/O protocols, one or more of the various I/O interconnects described herein may include, among other things, a multi-protocol switching fabric 314 comprising a plurality of cross-bar switches, as shown in FIG. 3. The multi-protocol switching fabric 314 may be similar to other multi-protocol switching fabrics described herein. In general, the switches 316a, 316b are devices comprising multiple ports 320s, 320b, 322a with the ability to route a packet from any input port to any output port. In various embodiments, the switches 316a, 316b may comprise any number of ports 320s, 320b, 322a, with each additionally including an internal control port 326a, 326b. The switches 316a, 316b may each optionally include a time management unit 330a, 330b for use in distributing and synchronizing time throughout the multi-protocol switching fabric 314, as described more fully herein.

Switch 316a may represent a first type of switch including null ports 320a configured to connect to a single optical or electrical link, while adapter ports 322a may be configured to connect to one or more mapped I/O protocol links. The adapter ports 322a may be used to connect mapped I/O protocol entities to the multi-protocol switching fabric 314. As used herein, the term "adapter" may be used to refer to the protocol adaptation function that may be built into the switch port to encapsulate the mapped I/O protocol packets into I/O packets that flow over the multi-protocol switching fabric 314.

Switch 316b may represent a second type of switch including only null ports 320b (like null ports 320a) configured to connect to a single optical or electrical link.

Although the switches 316a, 316b depicted in FIG. 3 each include four adapter ports 322a and four null ports 320a, 320b, the actual number of ports 320a, 320b, 322a may be fewer or more than that shown. In order to provide connectivity between switches 316a, 316b, a switch implementation generally minimally includes either at least one null port and at least one adapter port, or at least two null ports.

In various embodiments, the multi-protocol switching fabric 314 may comprise one or more of the first type of switches 316a and one or more of the second type of switches 316b.

For implementing various multi-protocol tunneling between adapter ports of a switching fabric within the scope of the present disclosure, a connection manager (not illustrated) may be provided. The connection manager may be implemented in software, firmware, as logic within an I/O complex, as part of a system BIOS, or within an operating system running on a computer apparatus or system in which the I/O complex is included.

Figure 4:
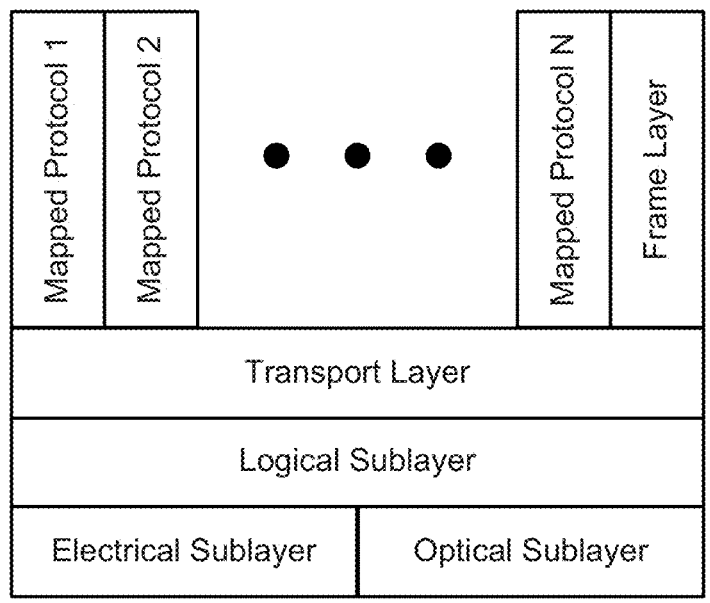
FIG. 4 describes a protocol stack for a multi-protocol interconnect architecture of an I/O complex, in accordance with various embodiments of the present disclosure.

An example protocol stack for the multi-protocol interconnect architecture of an I/O complex is shown in FIG. 4. The electrical and optical sublayers, the logical sublayer, the transport layer, and the frame layer may define the base multi-protocol interconnect architecture of the I/O complex, in which the physical layer comprises the electrical, optical, and logical sublayers. The mapped protocol layers may describe the mapping of the specific I/O protocols onto the multi-protocol interconnect architecture.

In various embodiments, and with reference to FIG. 3 and FIG. 4, the transport layer may be implemented by all ports 320a, 320b, 322a of the switches 316a, 316b of the multi-protocol switching fabric 314, the physical layer may be implemented by all null ports 320a, 320b, and the adapter ports 322a may implement a single mapped protocol layer or the frame layer.

Figure 5:
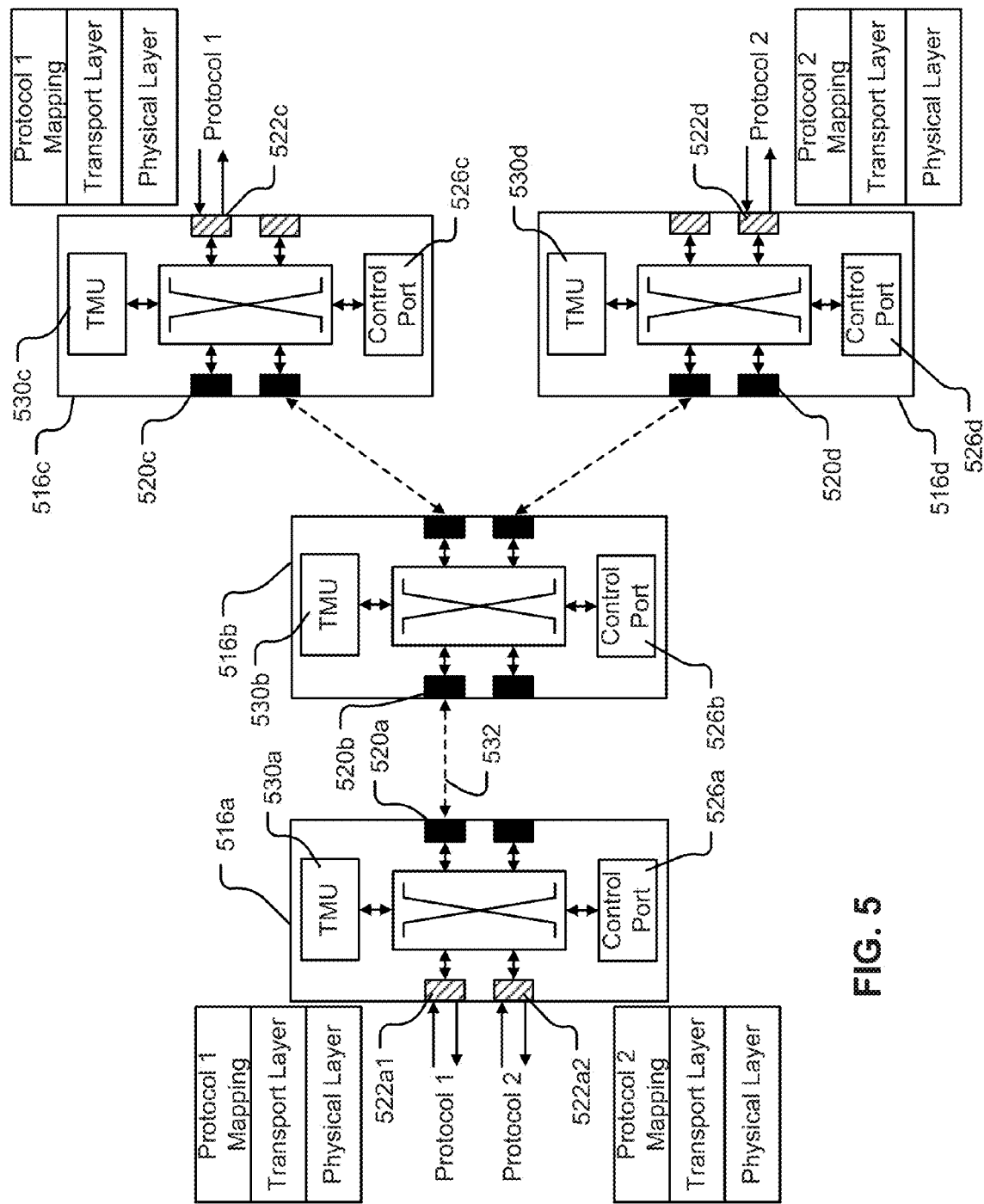
FIG. 5 describes an implementation of a protocol stack for a multi-protocol interconnect architecture of an I/O complex, in accordance with various embodiments of the present disclosure.

An example implementation of the protocol layering is shown in FIG. 5. In the example shown, two protocols are implemented using switches 516a, 516b, 516c, 516d. Each of the switches 516a, 516b, 516c, 516d include control ports 526a, 526b, 526c, 526d, and time management units 530a, 530b, 530c, 530d.

As shown, the adapter ports 522a1, 522c implement a first protocol layer (or frame layer) "protocol 1," and adapter ports 522a2, 522d implement a second protocol layer (or frame layer) "protocol 2." All ports implement the transport layer, while the physical layer is implemented by all null ports 520a, 520b, 520c, 520d.

As such, a link (e.g., link 532) between ports of switches may effectively be shared by multiple paths traversing the fabric between adapter ports of the multi-protocol switching fabric. In various embodiments, the multi-protocol interconnect architecture may be connection-oriented such that a path is configured end-to-end before data transfer takes place. The path may traverse one or more links through the multi-protocol switching fabric, and each hop, the path may be assigned a locally unique identifier that may be carried in the header of all the packets that are associated with the path. In various embodiments, packets belonging to the path may not be reordered within the multi-protocol switching fabric. Buffer allocation (flow control) and Quality of Service may be implemented on a per-path basis. As such, a path may provide virtual-wire semantics for a mapped I/O protocol across the multi-protocol switching fabric.

Figure 6A:
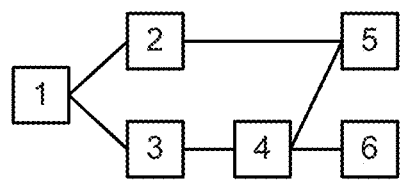
FIG. 6A describes a physical topology of a domain of switches, and FIG. 6B describes an embodiment of a spanning tree for managing the domain of FIG. 6A, in accordance with various embodiments of the present disclosure.
Figure 6B:
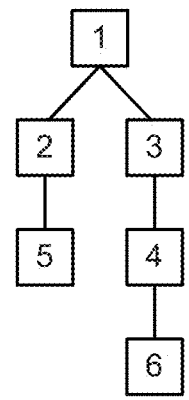

In various embodiments, the physical topology of a collection of switches (a domain) may be an arbitrarily interconnected graph. FIG. 6A shows an example of a physical topology of a domain of switches 1-6. It should be noted that a domain is a management concept rather than an operational one. In various embodiments, a connection manager, as described earlier, may configure the domains of a switching fabric. For further management purposes, a multi-protocol apparatus may be configured to create a spanning tree (by way of the connection manager, for example). FIG. 6B shows an example spanning tree created for managing the domain of FIG. 6A in which the switch 1 at the top of the spanning tree may be referred to as the root switch. It is noted that a spanning tree may include any suitable number of levels. In various embodiments, the maximum number of levels of the spanning tree may be seven.

Figure 7:
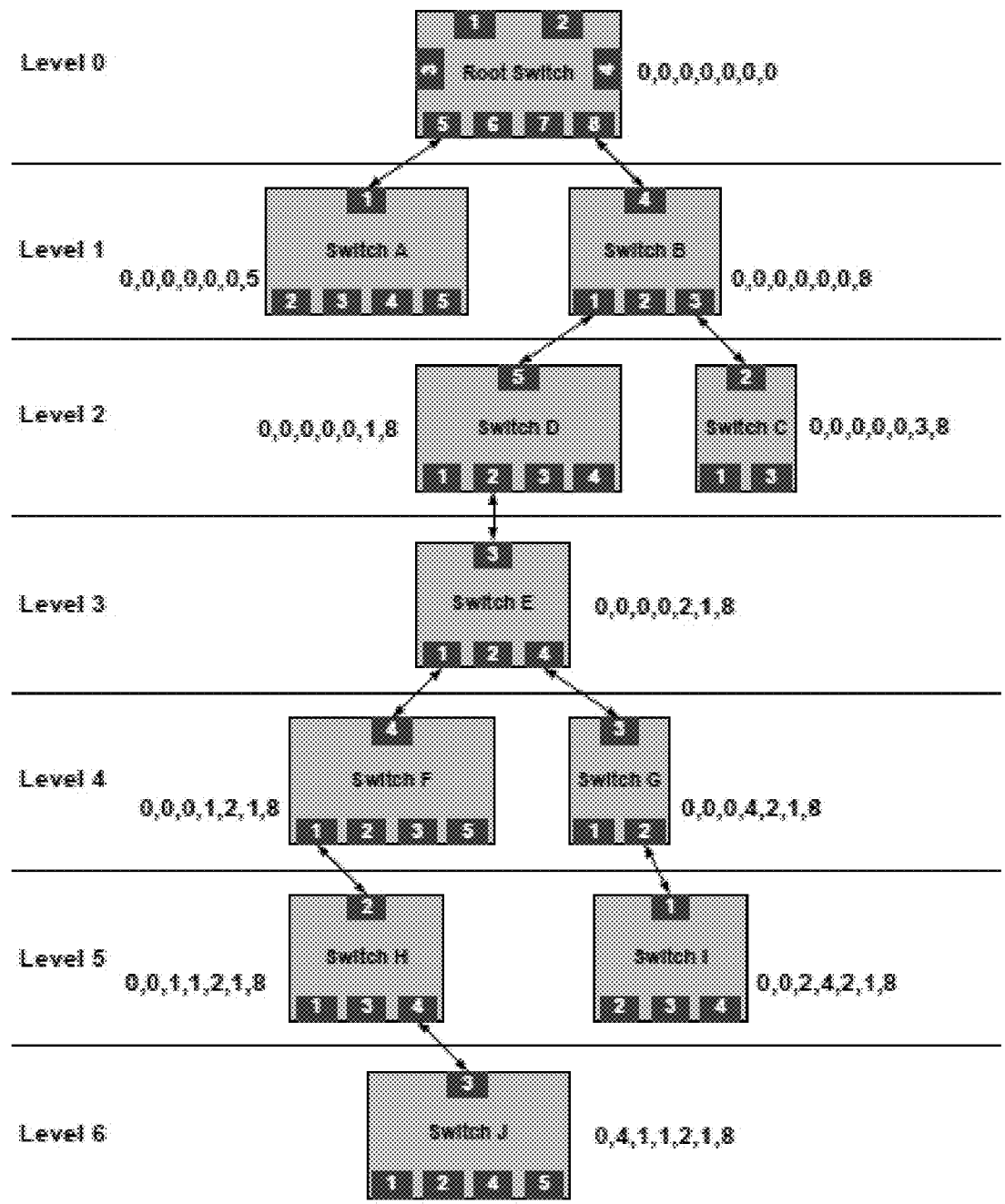
FIG. 7 describes a spanning tree in a domain, in accordance with various embodiments of the present disclosure.

FIG. 7 shows an example of a spanning tree in a domain. Also shown are example assignments of unique topology IDs to each of the switches in the domain. For example, switch J has a topology ID of 0,4,1,1,2,1,8. In various embodiments, unique topology IDs may be assigned to every switch of a domain and each topology ID may represent the position of the switch within the spanning tree of the domain. In various embodiments, the assignment of the topology IDs may be done by the connection manager during initialization in which the domains may be created by enumerating the switches that are reachable and the topology IDs may be assigned for each switch.

As shown in FIG. 7, the domain includes seven levels (levels 0-6), and the topology IDs of each of the switches are sequences of seven port numbers representing the egress ports at each level of the tree on the path, from the root switch to itself The topology ID of a switch at a depth of X (where X is from 0 to 6 in this example) may contain a non-zero port number for levels 0 to X−1. The port number at depth X may be 0 denoting the control port of the switch at depth X. The port numbers from depth X+1 to 6 may be treated as "don't care" and may be set at 0. Thus, in the example shown, the control port at the root switch has a topology ID of 0,0,0,0,0,0,0.

In various embodiments, the routing of configuration packets flowing downstream (in relation to the spanning tree) may be based on the topology ID of the target switch. The configuration packets may be routed in the transport layer packet header. In various embodiments, configuration packets flowing upstream may not use the topology ID and may simply be forwarded over the upstream port of each switch. Typically, every configuration packet carries a route string included in its payload. An example format of the route string is shown in FIG. 8. As shown, the route string may essentially be the topology ID of the switch to which the configuration request is sent or from which the configuration response originates. The MSB bit (CM bit) of the route string may be set to 0 when the configuration message is flowing downstream (from the connection manager to the switch) and set to 1 if the message is flowing in the upstream direction.

In various embodiments, each switch may be configured with its topology ID and its level in the spanning tree by the connection manager. Each switch may also be configured with the port number that points upstream to the connection manager of the domain either through hardware strapping or other similar mechanisms. In various embodiments, the topology ID, depth (in the tree), and upstream facing port may be configuration registers in the switch configuration space of every switch that are initialized by the connection manager during enumeration. An example format of the topology ID configuration register is shown in FIG. 9. For the illustrated example, the MSB of the topology ID may be a valid flag, which may be set to 0 on reset and set to 1 by the connection manager when the topology ID is initialized. The reserved bits of the topology ID may be set to 0.

Configuration packets flowing down the tree may be routed by the control port of a switch in accordance with one or more rules. For example, in various embodiments, the control port of the switch may be required to extract the port from the route string that corresponds to its configured level in the tree. In various embodiments, if the port is 0, the control port may be required to consume the packet. In various embodiments, if the port is non-zero, the control port may be required to forward the packet over the switch port that matches the port extracted from the route string. In various embodiments, configuration packets flowing up the spanning tree may simply be forwarded over the configured upstream facing port.

Figure 10:
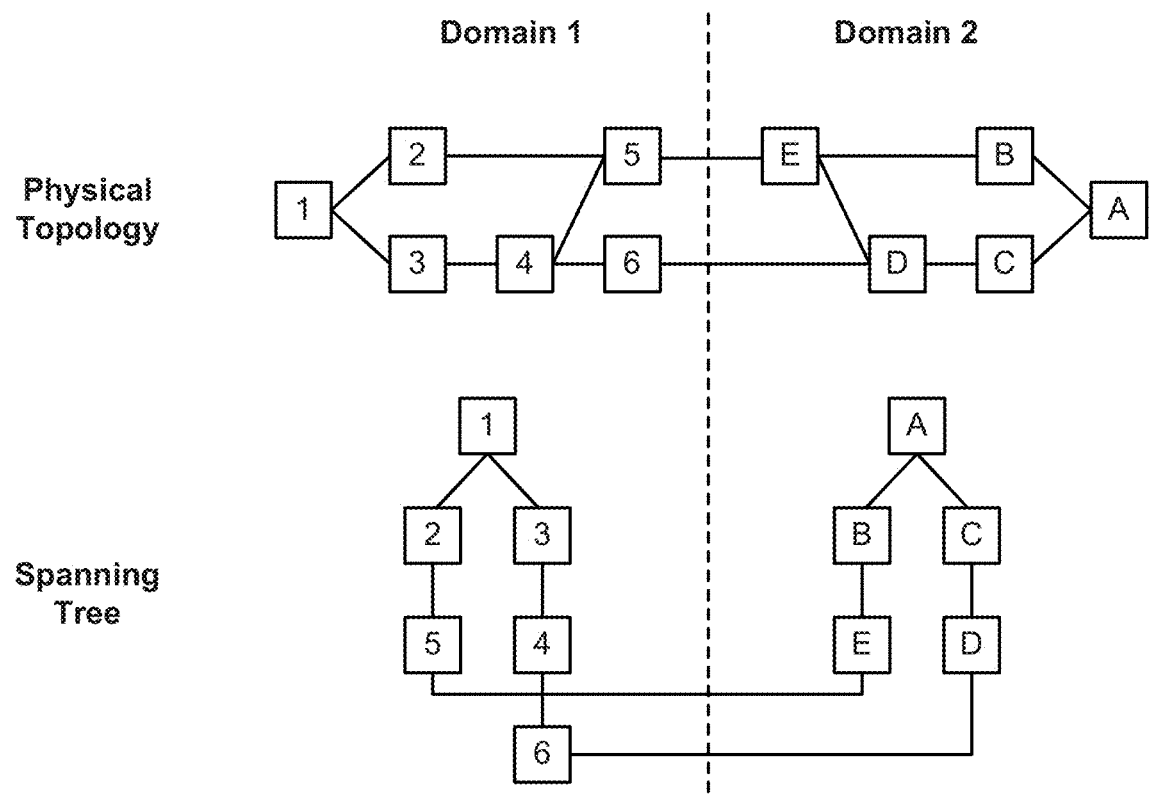
FIG. 10 describes connections that may be established between multiple domains, in accordance with various embodiments of the present disclosure.

Multiple domains may be interconnected in various embodiments. FIG. 10 shows example connections that may be established between multiple domains. As shown, switches 1-6 of Domain 1 may be interconnected with switches A-E of Domain 2.

In various embodiments, inter-domain links may be discovered either when the connection manager performs the initial discovery of the topology following power-on or by processing a hot-plug event. A link may be designated to be an inter-domain link when a read of the switch configuration space of the switch across the link results in an ERROR packet being sent that shows that the topology ID field has been previously assigned. When an inter-domain link is discovered, the connection manager may notify system software. The mechanism used to deliver the notification may be implementation-defined.

In various embodiments, the transport layer may only define the routing of inter-domain configuration packets between the two connection managers of the domains that are connected by an inter-domain link. Routing of configuration packets across multiple domains may be controlled by system software. When domains are daisy-chained, configuration packets passing from the originating domain may be delivered to the connection managers of every domain along the path to the target domain. The connection managers of the intermediate domains may pass the configuration packets to the system software which may be responsible for relaying the packet across the inter-domain link towards the target domain.

The routing of inter-domain REQUEST packets may be in accordance with one or more rules. For example, in various embodiments, system software on the originating domain may form REQUEST packet with a route string that points to the egress port of the domain that connects to the inter-domain link over which the packet must be forwarded and the CM bit may be set to 0. The packet may be required to be routed based on the route string at each hop within the domain and forwarded over the egress port across the inter-domain link. At the ingress port of the receiving domain, the control port may remap the route string to point to the ingress port over which the packet was received and the CM bit may be set to 1. In various embodiments, the packet may then be required to be routed to the connection manager of the receiving domain like other intra-domain configuration packets. The packet may be required to be delivered by the connection manager of the receiving domain to system software.

The routing of inter-domain RESPONSE packets may follow one or more of the same steps above. In various embodiments, system software that constructs the RESPONSE packet may use the route string in the corresponding REQUEST packet with the CM bit set to 0.

In various embodiments, the transport layer may employ a hierarchical, credit-based flow control scheme with respect to flow through the multi-protocol switching fabric to prevent or minimize overflow of receive buffers due to congestion. In various embodiments, the flow control scheme may allow a receiver to implement various buffer allocation strategies ranging from dedicated buffers per-path to shared buffer pools that are dynamically shared by multiple paths. In various embodiments, flow control may be turned off on a per-path basis. When flow control is turned off for a path, the path may be required to be provisioned with a receive buffer that can hold at least one maximum sized transport layer packet at each link.

Figure 11:
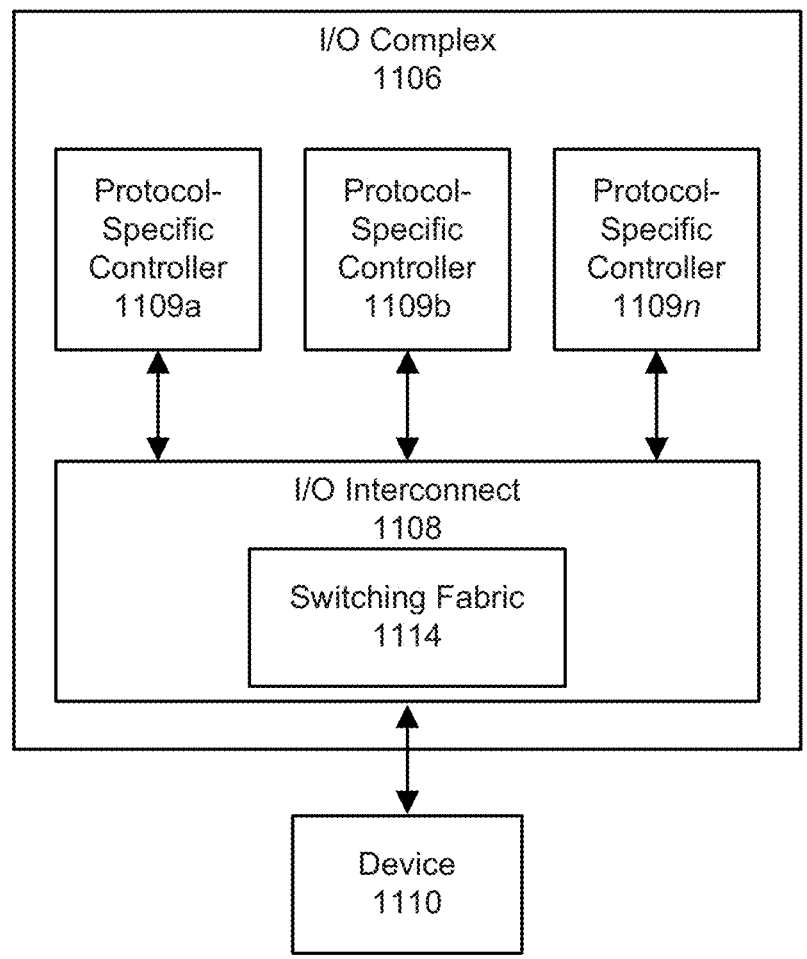
FIG. 11 describes a multi-protocol tunneling I/O complex and interconnect, in accordance with various embodiments of the present disclosure.

FIG. 11 shows an example I/O complex 1106 in accordance with various embodiments. I/O complex 1106 may be similar to the I/O complex 106 of FIG. 1, including an I/O interconnect 1108 configured to couple with a device 1110. The device 1110 may be configured with one or more I/O protocols (e.g., PCI Express®, USB, DisplayPort, HDMI®, etc.).

In various embodiments, the I/O complex 1106 may be configured to connect the device 1110 with one or more protocol-specific controllers 1109*a*, 1109*b*, . . . 1109*n* via the I/O interconnect 1108 in order to tunnel multiple I/O protocols over a common link in a manner that is transparent to the OS software stacks of tunneled I/O protocols. The protocol-specific controllers 1109*a*, 1109*b*, . . . 1109*n* may be configured to then communicate with respective protocol-specific drivers in the OS for configuring the device 1110 as if the device 1110 was directly connected with the protocol-specific controller 1109*a*, 1109*b*, . . . 1109*n*.

Figure 12:
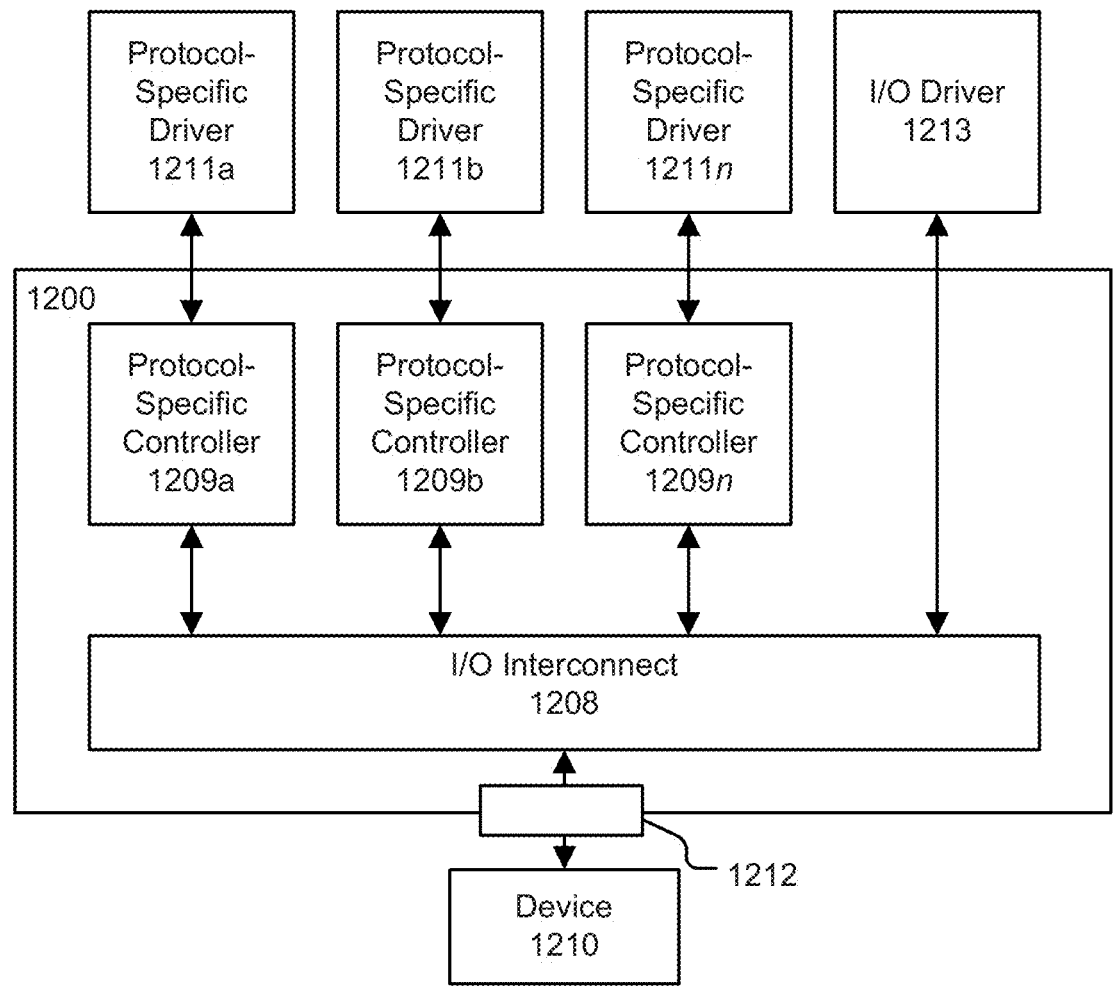
FIG. 12 describes a multi-protocol tunneling I/O complex and interconnect, in accordance with various embodiments of the present disclosure.

FIG. 12 shows an example hardware and software implementation of a multi-protocol apparatus (such as apparatus 100 of FIG. 1, for example) configured to tunnel multiple I/O protocols over a common link in a manner that is transparent to operating system software stacks of tunneled I/O protocols. In various embodiments, a multi-protocol apparatus may employ a multi-level hot-plug signaling scheme to support the tunneling of multiple I/O protocols over a common interconnect in a software-transparent manner.

For the implementation shown in FIG. 12, an I/O hot-plug indication may be sent by the I/O interconnect 1208 to the I/O driver in the OS (or to embedded I/O firmware) when the device 1210 is plugged into the non-protocol-specific connector port 1212 of the apparatus 1200. The hot-plug indication may then be processed by the I/O driver 1213 in the OS/firmware, resulting in communication path(s) being established between the I/O interconnect 1208 and the device 1210. In various embodiments, establishing communication path(s) may include configuring one or more paths between a source adapter and a destination adapter in a domain (described more fully elsewhere). Once the path(s) are established, mapped I/O protocol-specific configuration may be performed in which a protocol-specific hot-plug indication may be sent by the associated protocol-specific controller 1209a, 1209b, . . . 1209n to the respective protocol-specific driver 1211a, 1211b, . . . 1211n in the OS/firmware. The protocol-specific driver 1211a, 1211b, . . . 1211n may then configure the associated protocol-specific controller 1209a, 1209b, . . . 1209n as if the device 1210 was directly connected with the protocol-specific controller 1209a, 1209b, . . . 1209n. At this point, the peripheral device 1210 may be visible to system software and configured to be used by applications.

In various embodiments, the apparatus 1200 may be configured such that when the device 1210 is disconnected from the port 1212, a reverse sequence of events may occur. Specifically, the protocol-specific drivers 1211a, 1211b, . . . 1211n may process the protocol-specific unplug event, and then after the protocol-specific processing, the I/O driver 1213 may process the I/O unplug event.

Peripheral devices described herein (device 110, 210, 1110, or 1210, for example) may be any one of various types of devices, as noted earlier. In various embodiments, the peripheral device may be an expansion port (or other multi-protocol peripheral device) with which one or more other devices, with one or more I/O protocols, may be coupled. For example, for embodiments in which the peripheral device is an expansion port, the device may be simultaneously coupled with a PCI Express® device and a DisplayPort device, which may be coupled with an I/O complex through the expansion port device. In another example, the peripheral device may be a mobile or desktop computer system and one or more other devices may be coupled with the mobile or desktop computer system and with the I/O complex through the device. In various embodiments, multiple peripheral devices may be coupled together by daisy chaining the devices together.

Figure 13:
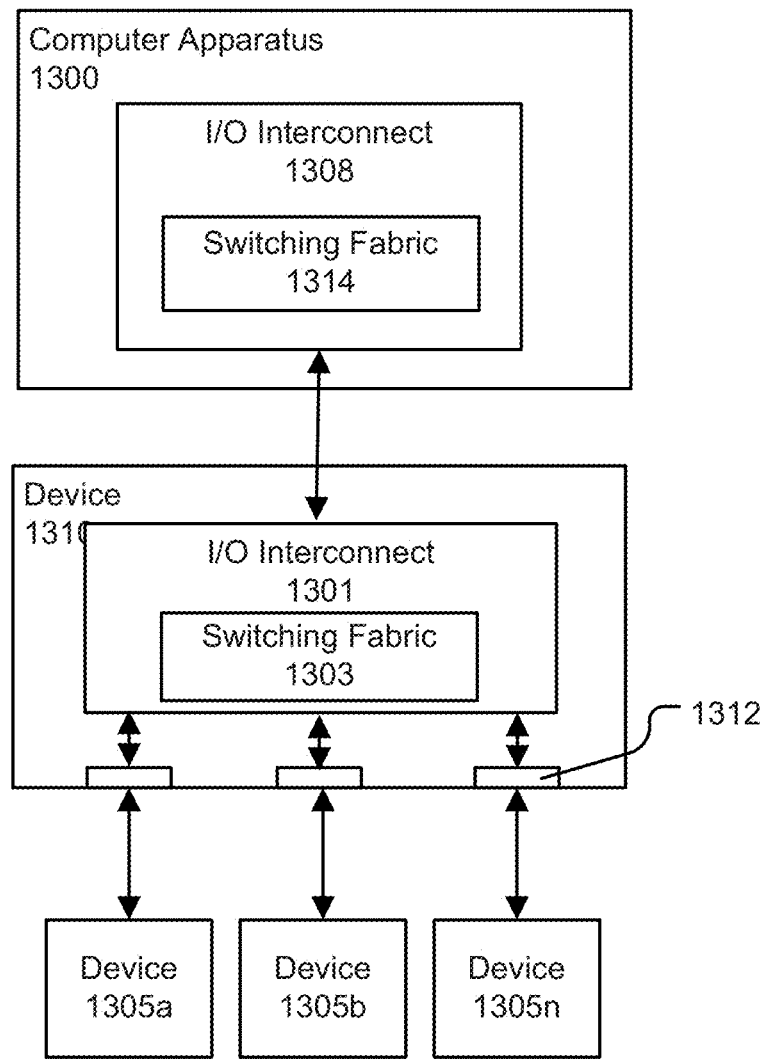
FIG. 13 describes a device (e.g., a peripheral device) including a multi-protocol tunneling I/O interconnect connected with a multi-protocol tunneling I/O interconnect, both in accordance with various embodiments of the present disclosure.

In various embodiments, the peripheral device and/or the other devices coupled with the peripheral device may also include an I/O interconnect similar to one or more of the I/O interconnects 108, 208, 1108, 1208 described herein. As shown in FIG. 13, for example, a device 1310 including a multi-protocol interconnect 1301, which in turn includes a multi-protocol switching fabric 1303, may be configured to be interconnected with a multi-protocol apparatus 1300 which also includes a multi-protocol interconnect 1308 and switching fabric 1314. One or more other peripheral devices 1305a, 1305b, . . . 1305n may be interconnected with the I/O interconnect 1301 via one or more corresponding non-protocol-specific ports 1312.

As noted herein, various embodiments of I/O complexes and apparatuses including I/O complexes may be configured to tunnel a multiple protocols across a multi-protocol interconnect in a software-transparent manner or substantially transparent manner. Specific examples of DisplayPort and HDMI® tunneling techniques will now be described in further detail with reference to FIGS. 14-19.

Figure 14:
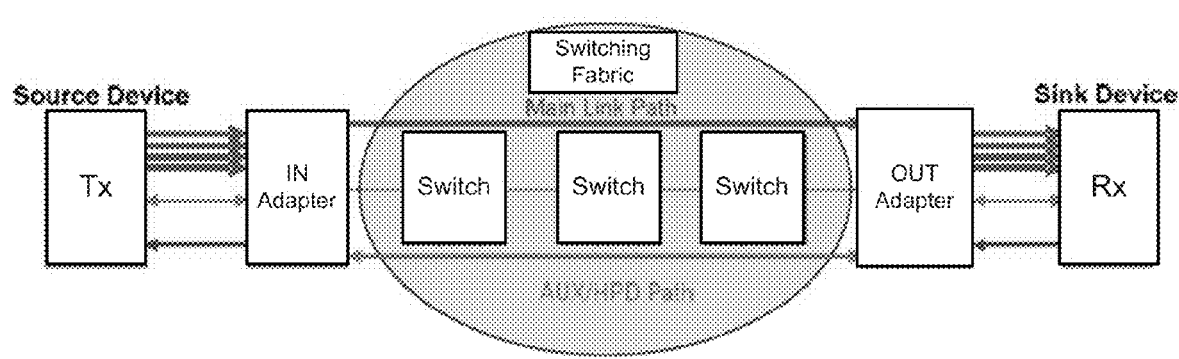
FIG. 14 describes an architecture for mapping a DisplayPort stream over a multi-protocol switching fabric, in accordance with various embodiments of the present disclosure.

FIG. 14 shows an example architecture for mapping a DisplayPort stream over a multi-protocol switching fabric described herein. The architectural model used for mapping DisplayPort may be that of a virtual wire between the DisplayPort source and the DisplayPort sink. The DisplayPort map may behave as a DisplayPort cable replacement and may therefore be completely transparent to the DisplayPort link from a source and sink (and software stack). The DisplayPort IN adapter may terminate a DisplayPort link from a source device and encapsulate DisplayPort main link and AUZ channel transmissions inside packets and transport them across the switch network. At the other end of the network, a DisplayPort OUT adapter may decapsulate the video and AUX channel data and recreate a DisplayPort link that connects to a sink device. Hot plug detect (HPD) indications may also be transmitted as packets.

Figure 15:
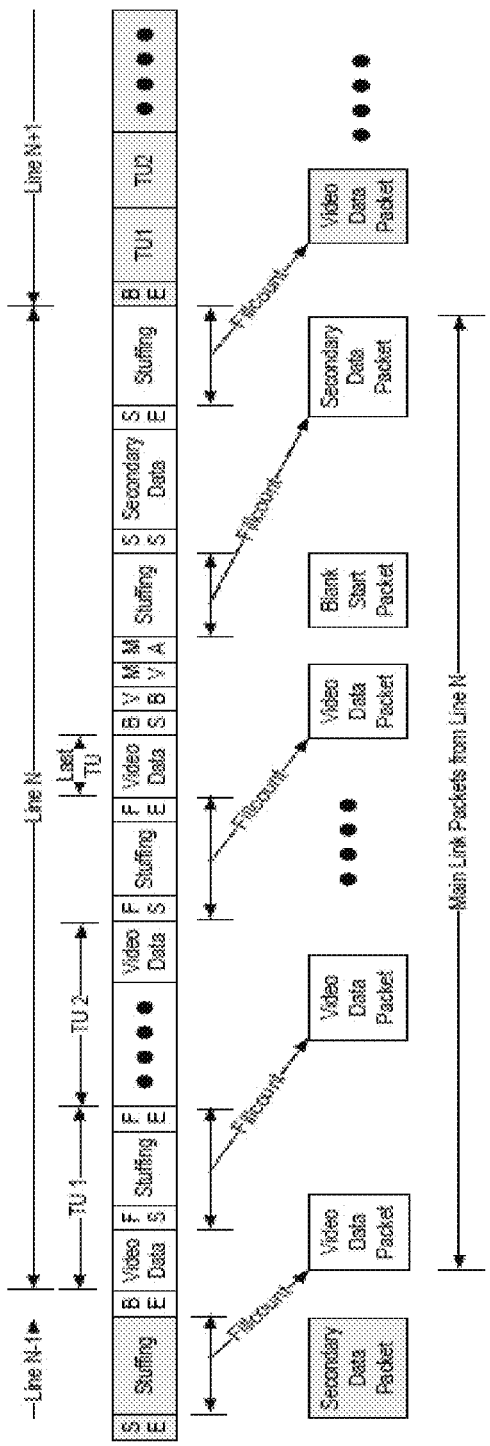
FIG. 15 describes a structure of a scan line and the packetization performed by the DisplayPort IN adapter, in accordance with various embodiments of the present disclosure.

In various embodiments, when a DisplayPort link is mapped onto a multi-protocol switching fabric described herein, the continuous main link data stream may be converted into multiple types of I/O packets. FIG. 15 shows an example structure of a scan line and the packetization performed by the DisplayPort IN adapter. During the packetization, all the stuffing symbols (within a transfer unit TU of active pixel data and during the blanking periods) may be discarded by the DisplayPort IN adapter and may be recreated by the DisplayPort OUT adapter. In order to enable accurate reconstruction of the stuffing at the DisplayPort OUT adapter, the DisplayPort IN adapter may include with each I/O packet a Fill Count field that may specify the number of stuffing symbols that were discarded immediately preceding the current packet as shown.

In various embodiments, AUX channel requests may be packetized and sent as I/O packets across the multi-protocol switching fabric by the DisplayPort IN adapter and may be replayed by the DisplayPort OUT adapter at the other end. AUX channel responses may be packetized and sent as I/O packets across the multi-protocol switching fabric by the DisplayPort OUT adapter and may be replayed by the DisplayPort IN adapter at the other end.

In various embodiments, HPD indications may be packetized and sent as I/O packets across the multi-protocol switching fabric by the DisplayPort OUT adapter and may be replayed by the DisplayPort IN adapter at the other end.

Figure 16:
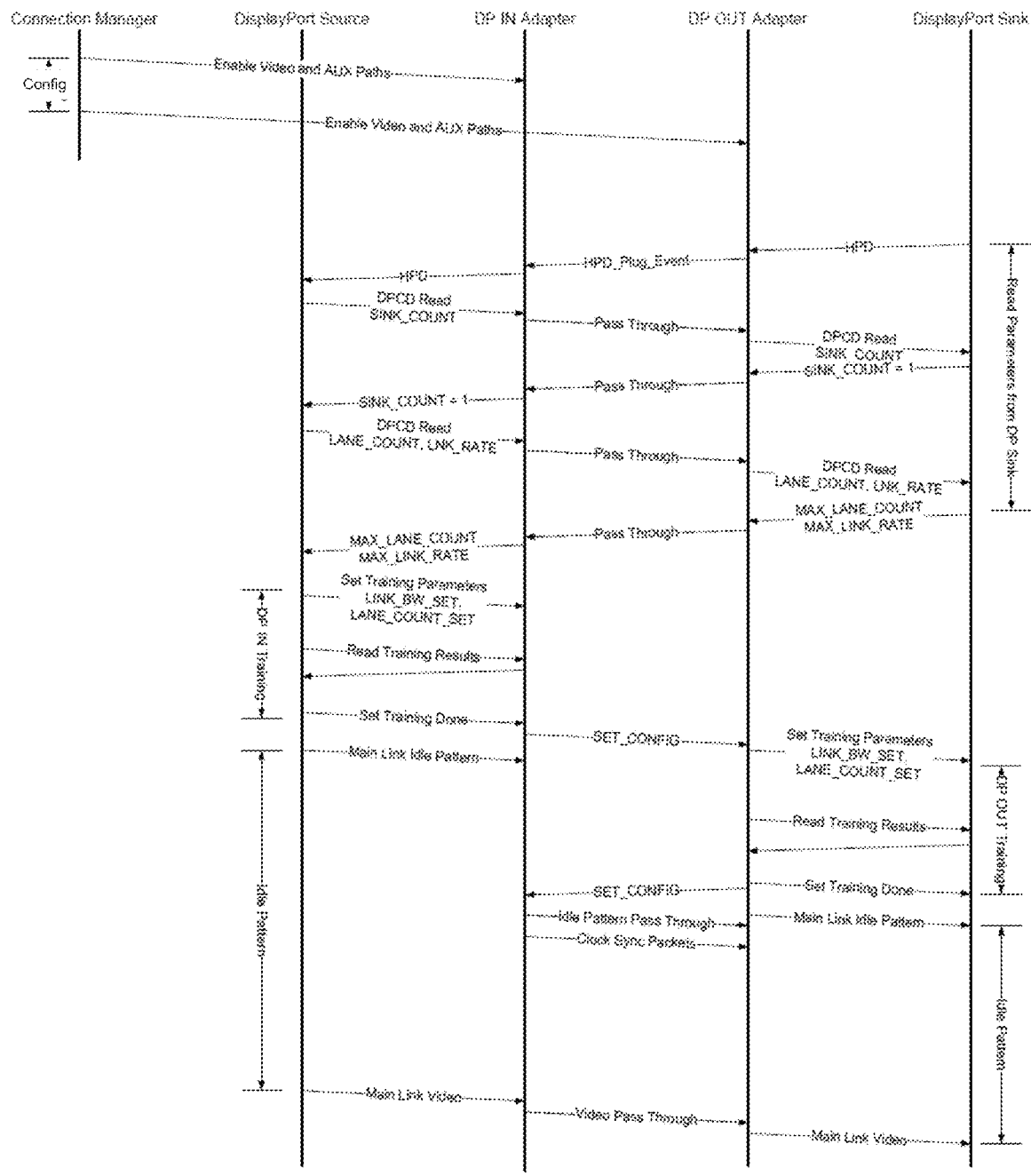
FIG. 16 describes a link initialization sequence of DisplayPort link training, in accordance with various embodiments of the present disclosure.

DisplayPort link training may be initiated by a graphics processing unit (GPU, not illustrated) over the AUX channel and may be carried out in such a way that the DisplayPort links between the GPU and the DisplayPort IN adapter and between the DisplayPort OUT adapter and the display device get trained to the same configuration. In various embodiments, this may result in that from the GPU perspective, display device hot-plug and unplug operations may be supported in the same way for a display device connected across a multi-protocol switching fabric as for a display device attached locally to the GPU. An example link initialization sequence is shown in FIG. 16 in which training fails at the first attempt and the DisplayPort OUT adapter is forced to select a reduced bit-rate configuration.

The DisplayPort tunneling architecture described herein may support transparent tunneling of premium content streams over a multi-protocol switching fabric described herein. The multi-protocol switching fabric may appear as a DisplayPort virtual wire directly connecting a High-bandwidth Digital Content Protection (HDCP) transmitter to a HDCP receiver. The HDCP content protection mechanisms may be handled transparently by the multi-protocol switching fabric.

Figure 17:
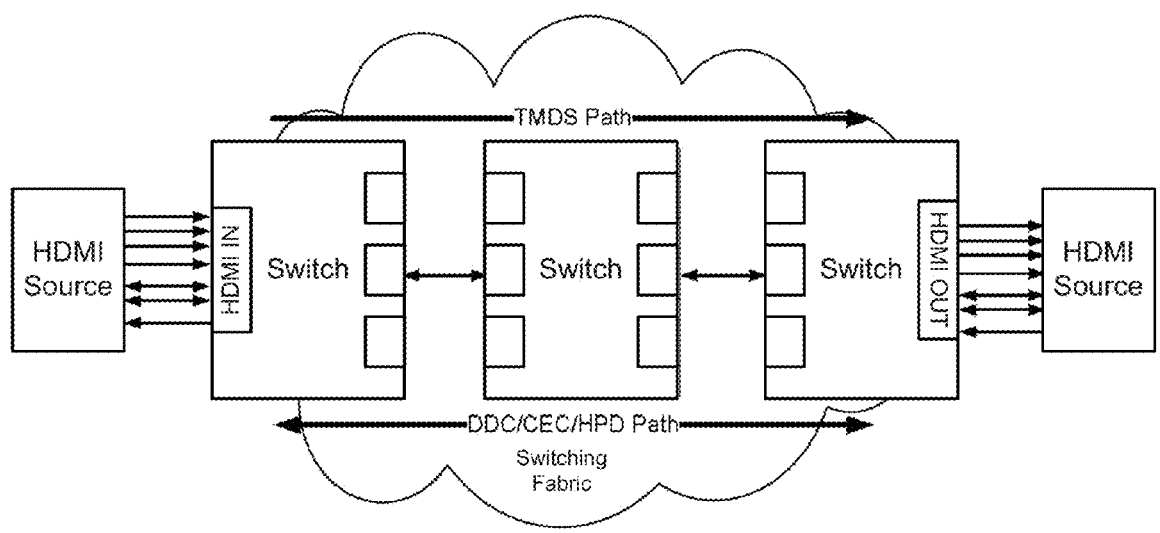
FIG. 17 describes an architecture for mapping an HDMI stream over a multi-protocol switching fabric, in accordance with various embodiments of the present disclosure.
Figure 28:
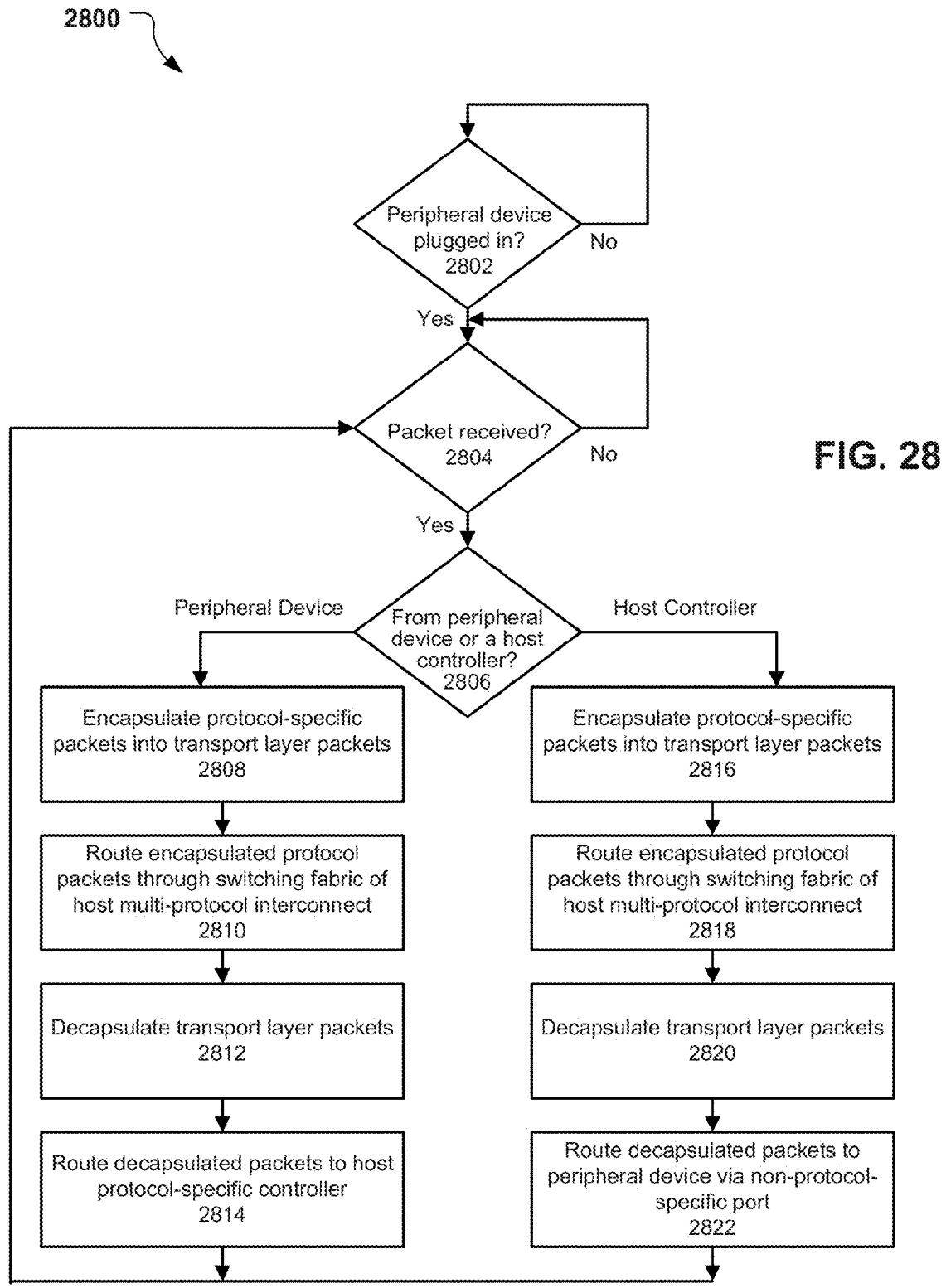
FIG. 28 is a flow diagram of a method for operating a computer apparatus including a multi-protocol tunneling I/O interconnect, in accordance with various embodiments of the present disclosure.

FIG. 17 shows an example architecture for mapping an HDMI stream over a multi-protocol switching fabric described herein. The architectural model used for tunneling HDMI may be that of a virtual wire between an HDMI source and an HDMI sink. The HDMI tunnel may behave as an HDMI cable replacement and may therefore be transparent to the HDMI source and sink (and to the software stack). As shown in FIG. 28, the HDMI IN adapter may terminate an HDMI link from a source device and encapsulate HDMI TMDS link and DDC channel transmissions inside I/O packets and transport them across the switch fabric network. At the other end of the network, an HDMI OUT adapter may decapsulate the TMDS and DDC channel data and recreate an HDMI link that connects to a sink device. HPD indications may also be transmitted as I/O packets.

Figure 18:
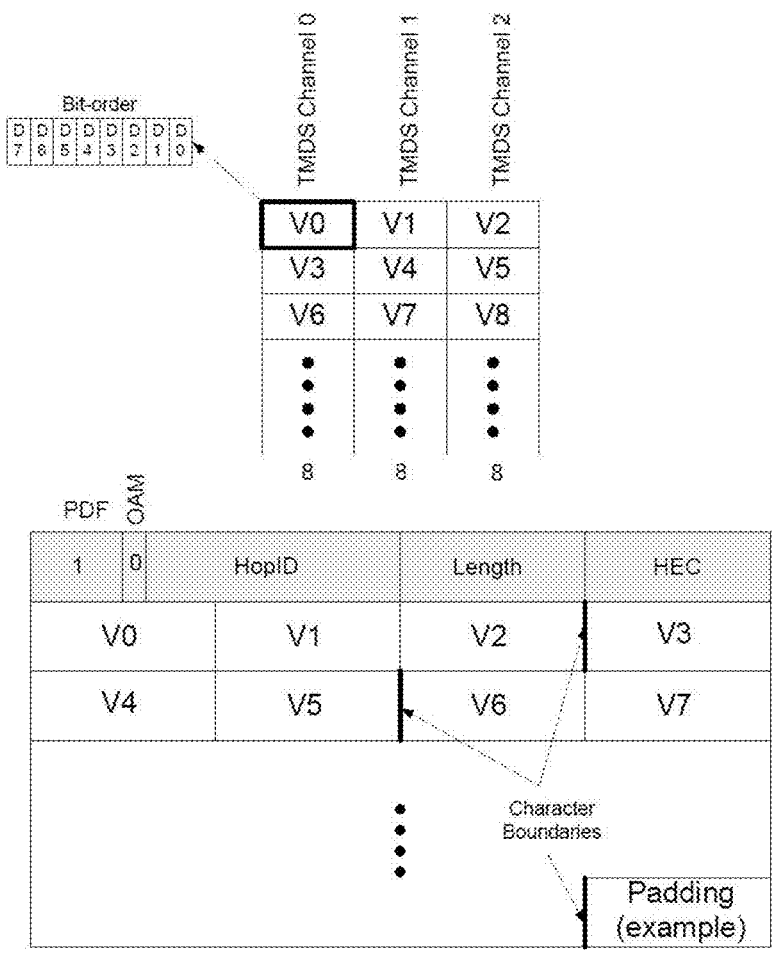
FIG. 18 describes a video island packet format, in accordance with various embodiments of the present disclosure.
Figure 19:
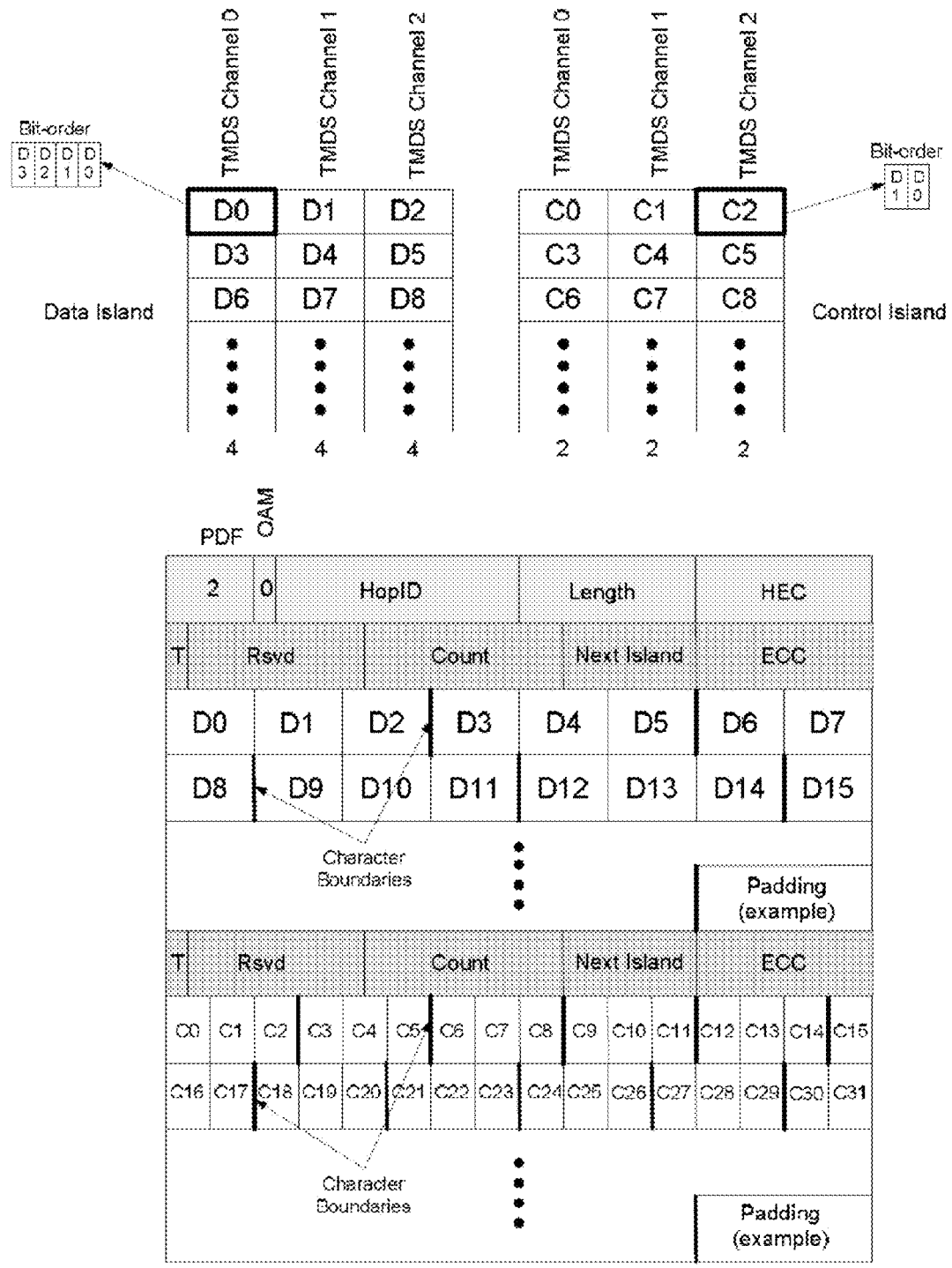
FIG. 19 describes a data/control island packet format, in accordance with various embodiments of the present disclosure.

In various embodiments, when an HDMI link is mapped onto a multi-protocol switching fabric described herein, the continuous TMDS link A/V stream may be converted into multiple types of I/O packets. A "video island packet" (carries pixel data) may be used to transport the active pixel data across the multi-protocol switching fabric from the HDMI IN adapter to the HDMI out adapter. Data/control island packets may be used to transport the data and control characters from the HDMI IN adapter to the HDMI OUT adapter. Example video island packet and data/control island packet formats are shown in FIGS. 18 and 19 respectively.

In various embodiments, the HDMI IN adapter may act as a proxy slave device on the bus. The HDMI IN adapter may receive the DDC transaction parameters sent by the HDMI Source and transmit them through the DDC path to the HDMI OUT adapter using a DDC request packet. The HDMI OUT Adapter may act as a proxy master device on the bus and initiate the DDC transaction to the HDMI Sink. When the HDMI Sink responds with data or acknowledgement, the HDMI OUT adapter may transmit the response to the HDMI IN adapter using a DDC response packet. When the HDMI IN adapter receives the DDC Response packet, the HDMI IN adapter may relay the transaction response to the HDMI Source.

In various embodiments, a link initialization may comprise various stages. A multi-protocol apparatus may be configured (e.g., through a software or firmware-based connection manager) to identify the active HDMI IN adapter and HDMI OUT adapter, and optionally, the plug/unplug events. A multi-protocol apparatus may be configured (e.g., through the connection manager) to set and enable paths between the HDMI IN adapter and the HDMI OUT adapter. The source may assert the 5v signal, and the HDMI IN adapter may pass the indication to the HDMI OUT adapter, which may forward it to the sink (unless already done due to 5VO bit). The sink may respond by asserting HPD. This indication may be forwarded to the HDMI IN adapter, which may forward it to the source. In various embodiments, the HDMI IN Adapter may optionally act as a storing repeater and read the sink before asserting HPD towards the source. When the TMDS link is locked at the HDMI IN adapter, it may send a link_up indication to HDMI OUT adapter (along with the HDMI/DVI state), and TMDS LPK packets and TMU clock sync packets may be sent from this stage. The HDMI OUT adapter may generate the TMDS clock, and when stable, start driving TMDS traffic.

When premium content is streamed, the multi-protocol apparatuses tunneling HDMI may employ content protection using HDCP. The HDMI mapping architecture described herein may support transparent mapping of premium content streams over a multi-protocol switching fabric. The HDMI map may appear as an HDMI link directly connecting an HDCP transmitter to an HDCP receiver. The HDCP content protection mechanisms may be handled transparently.

Various embodiments of I/O complexes described herein may be configured to implement a time synchronization protocol. In various embodiments, the time synchronization protocol may provide a mechanism for synchronizing the clocks of one or more switches of a multi-protocol switching fabric.

In various embodiments, a protocol for synchronizing time across a switching fabric may be a distributed protocol that specifies how the real-time clocks in a switch domain synchronize with each other. The clocks may be organized into a master-slave synchronization hierarchy with the clock at the top of the hierarchy ("grandmaster clock") determining the reference time for the entire domain. The synchronization may achieved by exchanging timing messages, with the slaves using the timing information to adjust their clocks to the time of their master in the hierarchy.

In various embodiments, time sync messages, state machines, and other entities may be associated with a particular domain. Time established within one domain by the protocol may be independent of the time in other domains. When multiple domains are inter-connected, an interdomain master-slave clock synchronization hierarchy may be established by selecting the grandmaster clock of one domain as the inter-domain grandmaster clock. The time sync protocol may then synchronize the grandmaster clocks of other domains to the inter-domain grandmaster clock.

Figure 20:
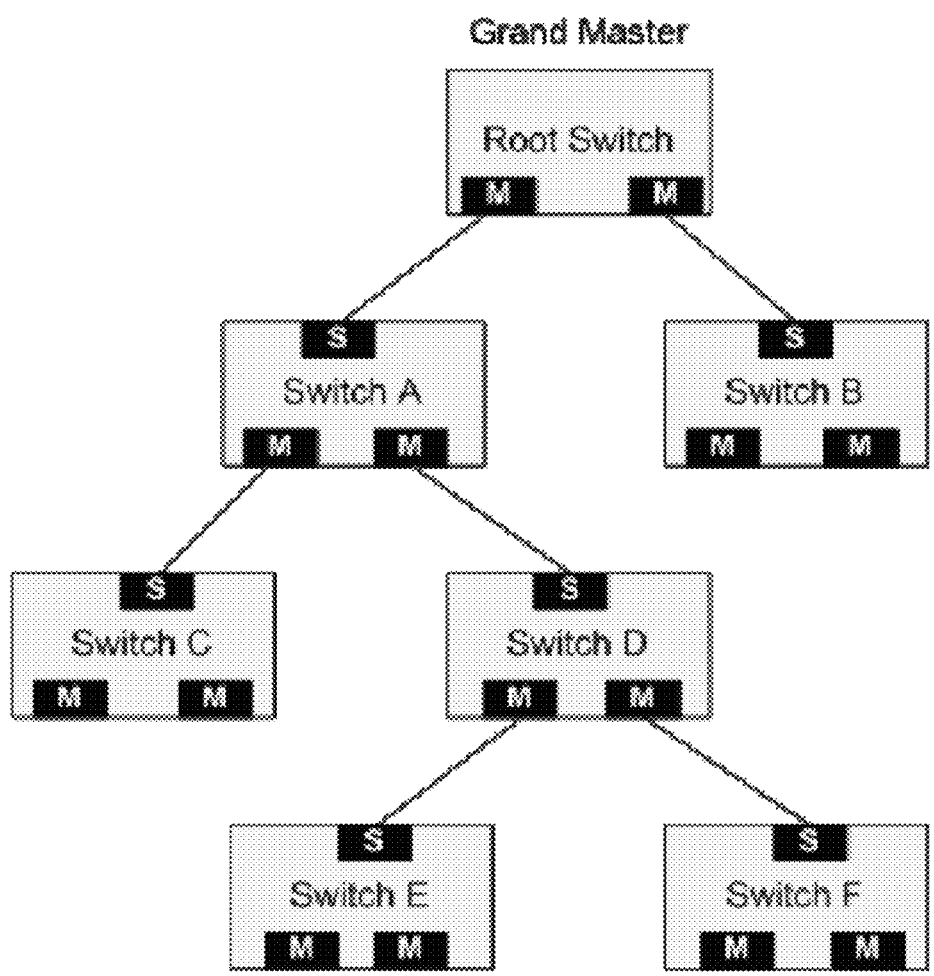
FIG. 20 describes a time synchronization hierarchy within a single domain of switches of a multi-protocol switching fabric of various I/O complexes, in accordance with various embodiments of the present disclosure.

FIG. 20 shows an example time synchronization hierarchy within a single domain of switches of a multi-protocol switching fabric of various I/O complexes described herein. The time synchronization hierarchy within a domain may be the same as the spanning tree established for configuration of the domain. The root switch of the domain may provide the Grandmaster clock for the domain. At every link, the downstream facing port may be treated as the master port and the upstream port may be treated as the slave port from the perspective of the time synchronization protocol. Each switch, therefore, may contain one slave port and one or more master ports. In various embodiments, the root switch may not contain a slave port as shown.

Figure 21:
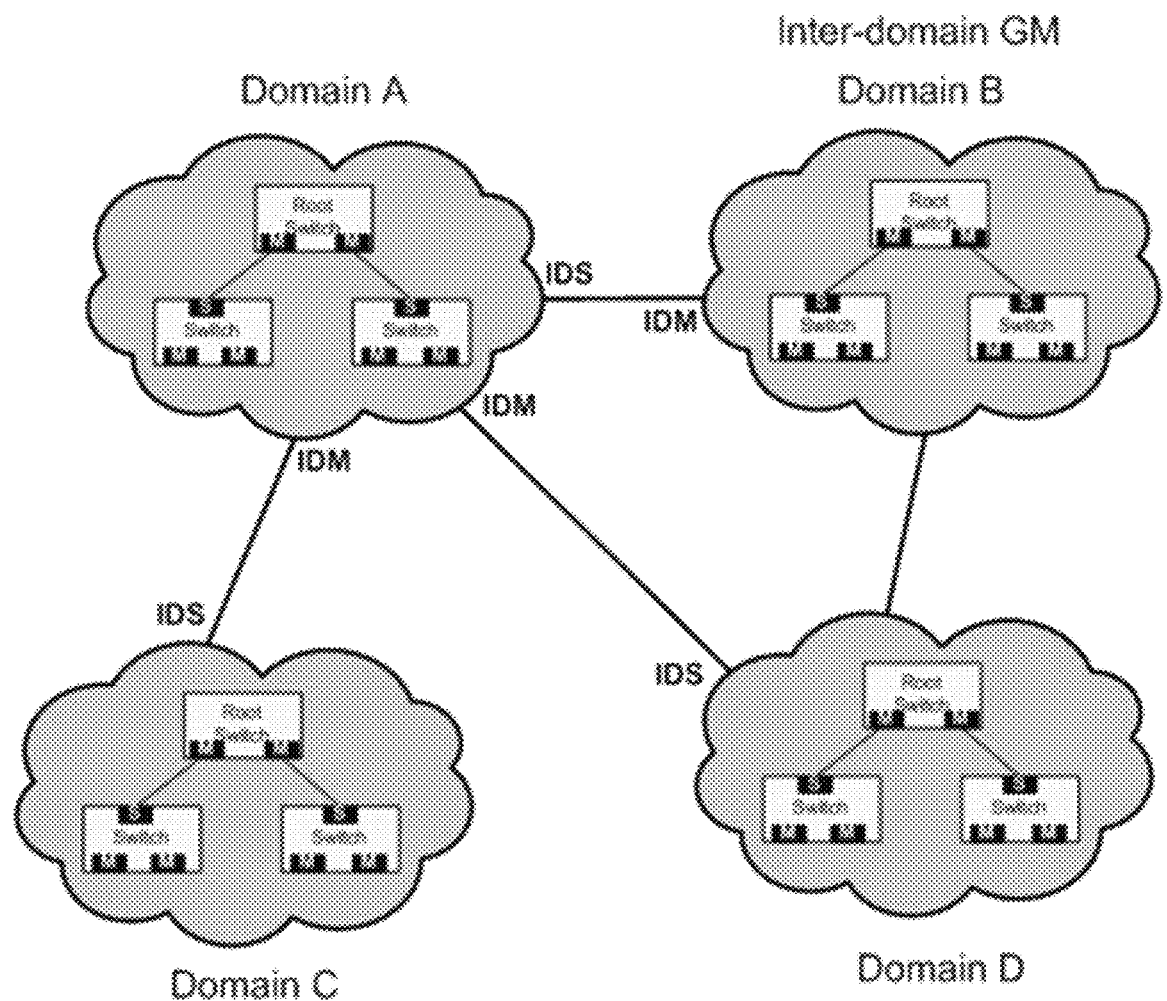
FIG. 21 describes multiple domains operatively coupled together, in accordance with various embodiments of the present disclosure.

Multiple domains may be connected together as shown in FIG. 21. When multiple domains are connected together, the default behavior may be to not synchronize the time across domains. Time synchronization may be enabled across domains by creating an inter-domain master-slave synchronization hierarchy by selecting one domain to act as the inter-domain grandmaster. The root switch of the selected domain may become the inter-domain grandmaster clock. In various embodiments, the time synchronization protocol may be enabled across an inter-domain link by configuring one end of the link to be the inter-domain master (IDM) and the other end of the link to be the inter-domain slave (IDS). In various embodiments, the inter-domain master-slave synchronization hierarchy may not contain loops.

In various embodiments, inter-domain links that are not configured (by software, for example) may not participate in the time synchronization protocol. As shown in FIG. 21, Domain B is chosen as the inter-domain grandmaster and the time synchronization protocol is enabled on the inter-domain links A↔B, A↔D, and A↔C. As also shown, inter-Domain time synchronization is not enabled on the link B↔D.

One or more of the switches of a multi-protocol switching fabric may provide a free-running oscillator (local clock entity) that is used to capture timestamps for the time synchronization protocol. In various embodiments, the free-running oscillator may run at a frequency of 125 MHz±100 ppm. A local-time register may be incremented by the free-running oscillator entity.

Although the timestamps may be captured using the free-running oscillator, each switch may know the error (both in time and frequency) of the local time relative to the grandmaster time. The time offset between the local time of the free-running oscillator and the grandmaster time may be represented in a 64-bit time-offset-from-grandmaster register. This register may hold a signed fractional value and use 2's complement representation and may specify time in nanoseconds multiplied by 216. For example, 2.5 ns may be represented as 0x0000000000028000. A value of one in all bits, except the most significant, of the field, may indicate that the offset from grandmaster time may be too big to be represented. In various embodiments, the time-offset-from-grandmaster register of the root switch (the grandmaster of the domain) may be set to 0 except when the domain is configured as a slave for inter-domain time synchronization.

In various embodiments, the frequency offset between the free-running oscillator and the grandmaster clock may be represented in a frequency-offset-from-grandmaster register. This register may specify the fractional frequency offset and hold a signed fractional value represented using 2's complement notation.

In various embodiments, the time-offset-from-grandmaster register and frequency-offset-from-grandmaster register may be updated at the conclusion of every time sync packet exchange. Implementations may attempt to minimize the value of the time offset from the grandmaster although this is not required for the time sync protocol operation. This can be done either by tuning the frequency of the free-running oscillator and/or by adjusting the local-time register.

Figure 22:
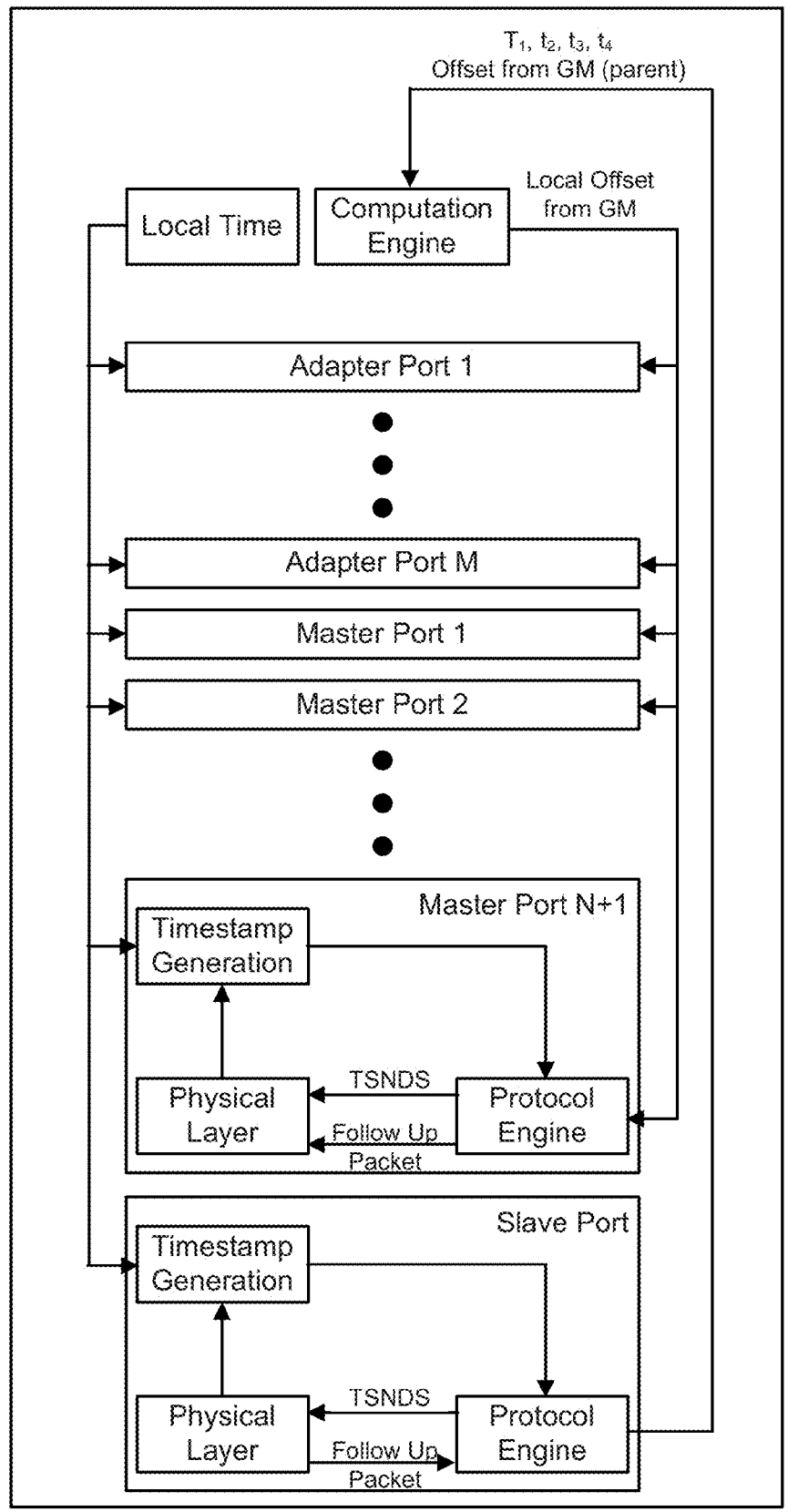
FIG. 22 describes a model of a switch assumed by various embodiments of the time synchronization protocol.

FIG. 22 shows an example model of a switch assumed by various embodiments of the time synchronization protocol. As shown, the upstream port of the switch is the designated slave port while all the downstream ports of the switch are designated as master ports. The local clock entity, which may include the free-running oscillator described herein, and the computation engine may be common to all the ports of the switch. The slave port may provide the timestamp measurements of the computation engine that may enable the computation of the offset of the local time from the grandmaster time. The local time value and the computation results may be made available to all adapter ports of the switch to enable the implementation of any adapter-specific time synchronization functions.

In various embodiments, each master or slave port may contain a protocol engine that may be responsible for processing time synchronization messages. Messages used for synchronizing time within a domain may terminate in the protocol engine of the ports and may not be forwarded. Inter-domain time synchronization messages may be forwarded by the protocol engine of a receiving master port to the protocol engine of the slave port. The protocol engine of the slave port may be responsible for forwarding the message towards the grandmaster of the domain by transmitting it towards its link partner.

In various embodiments, the generation of timestamps may be performed by the physical layer of the ports. The timestamp generation may be done when the timestamp point of the synchronization message passes a reference plane in the physical layer.

Figure 23:
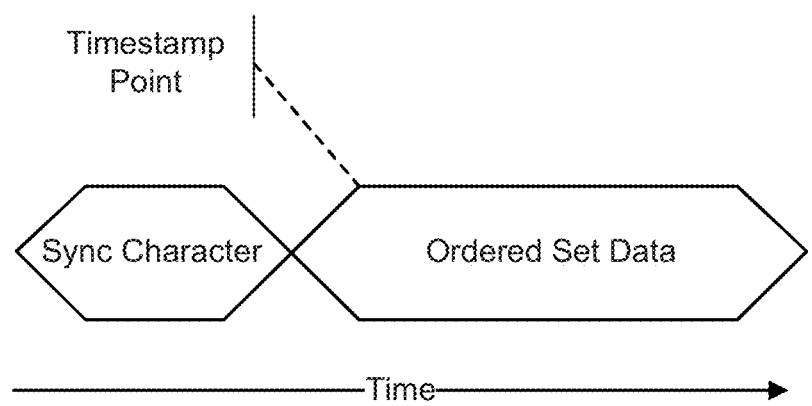
FIG. 23 describes a timestamp measurement model, in accordance with various embodiments of the present disclosure.

FIG. 23 shows an example timestamp measurement model. In various embodiments, a timestamp event may be generated at the time of transmission and reception of a time sync notification ordered set (TSNOS), which may be used to help the time management units (see, e.g., TMUs of FIGS. 4 and 6) locking an accurate time stamp when transmitting or receiving a TMU packet. The point in the TSNOS between the last bit of the sync character and the first bit of the ordered set data may be referred to as the timestamp point. In various embodiments, the sync character may comprise 2 bits while the ordered set data may comprise 64 bits. Within the physical layer, the timestamp may be taken when the timestamp point passes a reference point called the reference plane. The reference plane may be permitted to be different for the transmit and receive paths through the physical layer. In various embodiments, the same transmit reference plane may be used, however, for all transmitted TSNOS and the same receive reference plane may be used for all received TSNOS. In various embodiments, the timestamp measurement has a resolution of at least 8 ns.

Figure 24:
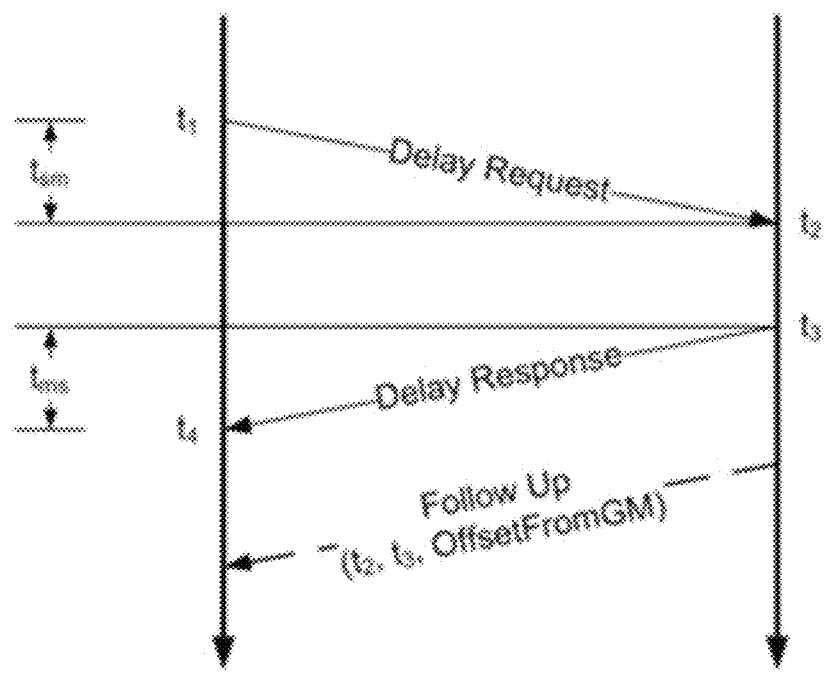
FIG. 24 describes a time sync packet exchange protocol, which may be used to measure the time offset between the master and slave clocks, in accordance with various embodiments of the present disclosure.

FIG. 24 shows an example time sync packet exchange protocol, which may be used to measure the time offset between the master and slave clocks. In various embodiments, the measurement is only made on the slave port of a switch. As shown in the timing diagram, the time sync packet exchange uses delay request, delay response, and follow up messages. Delay request and delay response messages may be implemented using the TSNOS (described above). The follow up message may be a transport layer packet.

In various embodiments, the follow up message may be sent by the master to the slave and may contain timestamps t2 and t3 captured at the master along with the current snapshot of the master's time-offset-from-grandmaster and frequency-offset-from-grandmaster registers. The time-offset-from-grandmaster and frequency-offset-from-grandmaster registers of the grandmaster may be encoded as 0 except when inter-domain time synchronization is enabled.

In various embodiments, the transmission rate of the delay request packets may be determined by a configuration register of a port of a switch. The delay response packets may be transmitted as soon as possible after the receipt of the associated delay request packet. Follow up packets may be transmitted as soon as possible after the transmission of the associated delay response packet.

In an error occurs during the transmission or reception of any of the time sync messages, the entire packet exchange cycle may be voided. A new cycle may then be started after an interval determine by the configuration register. The computation of the time offset from the grandmaster time is described in more detail below.

When two or more domains are connected together, time synchronization may be enabled across the inter-domain link by configuring one end of the link as the inter-domain slave and the other end as the inter-domain master. An example inter-domain time sync protocol is shown in FIG. 25.

Figure 25:
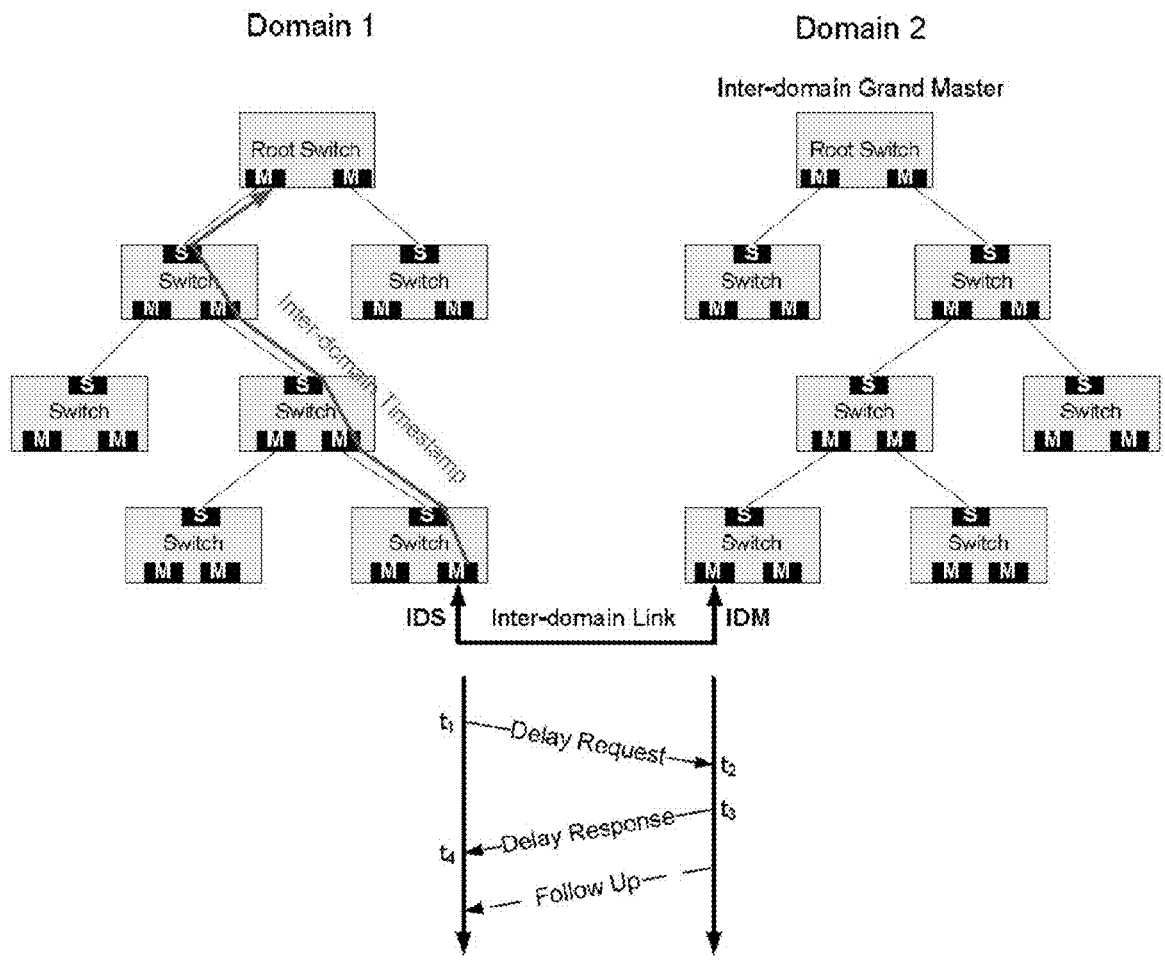
FIG. 25 describes inter-domain time sync protocol, in accordance with various embodiments of the present disclosure.

As shown in FIG. 25, when time synchronization is enabled, an identical packet exchange may occur over the inter-domain link with the inter-domain slave initiating the packet exchange. The computed time and frequency offsets between the grandmaster clock of the inter-domain slave port and the grandmaster clock of the inter-domain master port may be passed up the time synchronization hierarchy in the slave domain by using a transport layer packet called the inter-domain timestamp packet. When the inter-domain timestamp packet reaches the grandmaster (root switch) of the slave domain, the time-offset-from-grandmaster and frequency-offset-from-grandmaster registers in the grandmaster may be updated with the computed time offset and frequency offset respectively contained in the inter-domain timestamp packet. The grandmaster's time-offset-from-grandmaster and frequency-offset-from-grandmaster registers may then be passed down the time synchronization hierarchy in the slave domain in FollowUp packets. This may result in all the switches in the slave domain synchronizing their time to the inter-domain grandmaster clock.

Various embodiments described herein may provide computation of time and frequency offsets between a local clock entity on a switch and a grandmaster clock entity on a root switch in a network of switches connected together in one or more management domains. In various embodiments, a time synchronization protocol may include capturing four timestamps periodically across a link between two ports (master and slave). Various digital signaling processing operations may be applied to the timestamps to compute the time and frequency offset of the local clock entity relative to a grandmaster clock. By using digital signaling-type and low-pass filtering-type techniques applied to the multiple timestamps described herein, greater accuracy in time and/or frequency offsets may be obtained, even over larger sized networks of switches.

Figure 26:
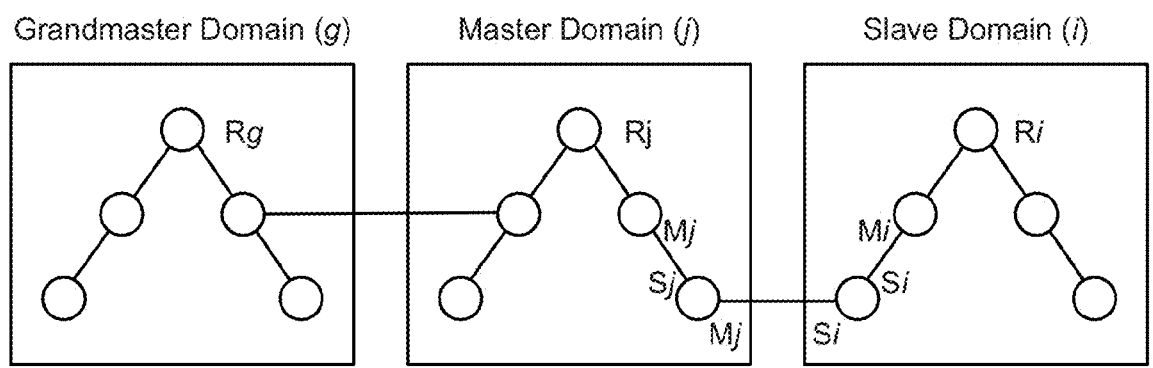
FIG. 26 describes a topology for time synchronization, in accordance with various embodiments of the present disclosure.

FIG. 26 shows an example topology for time synchronization. As shown, the root switch of the domain i is indicated by using the notation Ri, and master and slave switches in domain i are indicated as Mi and Si respectively. It is noted that in various embodiments, the same switch will act as a slave in its upstream port and as a master on all its downstream ports, as shown. A switch may also act as an inter-domain master or as an inter-domain slave.

Table 1 below shows example definitions of terminology of various variables used herein in describing intra-domain time sync computations, inter-domain time sync computations, and grandmaster time computations.

In various embodiments, timestamps may be generated by the physical layer and may be corrected for asymmetry between transmit and receive paths. The slave may correct for asymmetry by performing the following computations:

$$t1 = \text{delay request sent timestamp} + \text{TxTimetoWire}$$

$$t4 = \text{delay response received timestamp} + \text{RxTimetoWire}$$

where TxTimetoWire and RxTimetoWire may be configuration registers in the slave's port configuration space that specify the time duration between the instant the timestamp is taken and when the first bit of the TSNOS is received/transmitted on the wire.

In various embodiments, the master may correct for asymmetry by performing the following computations:

$$t2 = \text{delay request received timestamp} + \text{RxTimetoWire}$$

$$t3 = \text{delay response sent timestamp} + \text{TxTimetoWire}$$

where TxTimetoWire and RxTimetoWire may be configuration registers in the master's port configuration space that specify the time duration between the instant the timestamp is taken and when the first bit of the TSNOS is received/transmitted on the wire. The corrected values t2 and t3 may be sent to the slave in the follow up packet.

For intra-domain sync computations, the frequency ration between the master's local clock entity and the slave's local clock entity at the conclusion of every nth time sync packet exchange using the following equation:

$$f(S_i, M_i)[0] = 1$$

$$f(S_i, M_i)[1] = \frac{(t_1[1] - t_1[0])}{(t_2[1] - t_2[0])}$$

-continued $$f(S_i, M_i)[N] = f(S_i, M_i)[N-1] - \frac{f(S_i, M_i)[N-1]}{2^\alpha} + \frac{(t_1[N] - t_1[N-1])}{2^\alpha (t_2[N] - t_2[N-1])}$$

TABLE 1

Example Variable Definitions

| Variable | Definition |
|---|---|
| n | Refers to the $n^{th}$ completed time sync packet exchange between a master and a slave. |
| N | Refers to the number of time sync packet exchanges over which the frequency offset is computed. This value is obtained from the FreqMeasurementWindow register in the time sync device configuration space. |
| $t_1[n]$ | Timestamp in slave's timebase when the Delay Request TSNOS is transmitted. Includes transmit asymmetry corrections at the slave. |
| $t_2[n]$ | Timestamp in master's timebase when the Delay Request TSNOS is received. Includes receive asymmetry corrections at the master. This timestamp is communicated by the master to the slave in the follow up packet. |
| $t_3[n]$ | Timestamp in master's timebase when the Delay Response TSNOS is transmitted. Includes transmit asymmetry corrections at the master. This timestamp is communicated by the master to the slave in the follow up packet. |
| $t_4[n]$ | Timestamp in slave's timebase when the Delay Response TSNOS is received. Includes receive asymmetry corrections at the slave. |
| $t_{last}(x)[n]$ | Equal to the most recent value of the $r_4[n]$ obtained at the conclusion of a time sync packet exchange between switch x and its master. |
| $t_{last-id}(x)[n]$ | Equal to the most recent value of the inter-domain timestamp value contained in the follow up packet received from switch x's master. This value is computed by an inter-domain slave node in the domain of the switch x's master. |
| $S_i$ | A time sync slave in domain i. |
| $M_i$ | A time sync master in domain i. |
| $R_i$ | Root switch in domain i. Also the grandmaster of the domain. |
| f(x, y)[n] | Average frequency ratio between switch x's LocalClock entity and switch y's LocalClock entity defined by the equation $$f(x, y) = \frac{f_x}{f_y}$$ |
| F(x, y)[n] | Average frequency offset between switch x's LocalClock entity and switch y's LocalClock entity defined by the equation $F(x, y) = [f(x, y) - 1]2^{41}$ |
| D(x, y)[n] | Average propagation delay between switch x and switch y expressed in switch x's timebase. |
| O(x, y)[n] | Average time offset between switch x's LocalClock entity and switch y's LocalClock entity computed relative to the end of a time sync packet exchange $z_4[n]$. The time offset is defined by the equation O(x, y) = (Switch x's local time at instant $t_4[n]$) − (Switch y's local time at instant $t_4[n]$). |
| θ(x, y)[n] | Average time offset between switch x's LocalClock entity and switch y's LocalClock entity computed relative to time instant $t_2[n]$. The time offset is defined by the equation θ(x, y) = (Switch x's local time at instant $t_3[n]$) − (Switch y's local time at instant $t_3[n]$). |
| α | Co-efficient of the IIR filter used to average the frequency ratio. This value is obtained from the FreqAvgConst register in the Time Sync device configuration space. |
| β | Co-efficient of the IIR filter used to average the propagation delay. This value is obtained from the DelayAvgConst register in the time sync device configuration space. |
| γ | Co-efficient of the IIR fitter used to average the time offset. This value is obtained from the OffsetAvgConst register in the time sync device configuration space. |
| δ | Co-efficient of the IIR fitter used to average the time offset error. This value is obtained from the ErrorAvgConst register in the time sync device configuration space. |

In various embodiments, the frequency offset between the master's local clock entity and the slave's local clock entity may be computed using the equation:

$$F(S_i, M_i)[N] = \{f(S_i, M_i)[N] - 1\} 2^{41}$$

In various embodiments, the frequency ration between the slave's local clock entity and the grandmaster's local clock entity may be computed using the equation:

$$f(S_i, R_i)[N] = f(S_i, M_i)[N] \left\{ 1 + \frac{F(M_i, R_i)[N]}{2^{41}} \right\}$$

In various embodiments, the frequency offset between the slave's local clock entity and the grandmaster's local clock entity may be computed using the equation:

$$F(S_i, R_i)[N] = \{f(S_i, R_i)[N] - 1\} 2^{41}$$

At the conclusion of time sync packet exchanges, the mean propagation delay between the slave and the master may be computed using the equation:

$$D(M_i, S_i)[0] = \frac{\{(t_4[0] - t_1[0]) - (t_3[0] - t_2[0])\}}{2}$$

$$D(M_i, S_i)[n] =$$

$$D(M_i, S_i)[n-1] - \frac{D(M_i, S_i)[n-1]}{2^\beta} + \frac{\left\{ \frac{(t_4[n] - t_1[n])}{f(S_i, M_i)[N]} (t_2[n] - t_3[n]) \right\}}{2^{(\beta+1)}}$$

At the conclusion of time sync packet exchanges, the time offset $(O(S_i, M_i)[n])$ between the slave and the master may be computed using the following equations:

$$W(S_i, M_i)[0] = (t_3[0] - t_4[0] + D(M_i, S_i)[0])$$

$$W(S_i, M_i)[n] =$$

$$W(S_i, M_i)[n-1] - \frac{W(S_i, M_i)[n-1]}{2^\gamma} + \frac{(t_3[n] - t_4[n] + D(M_i, S_i)[n])}{2^\gamma}$$

$$E(S_i, M_i)[0] = 0$$

$$E(S_i, M_i)[n] = E(S_i, M_i)[n-1] - \frac{E(S_i, M_i)[n-1]}{2^\delta} +$$

$$\frac{(W(S_i, M_i)[n] - t_3[n] + t_4[n] - D(M_i, S_i)[n])}{2^\delta}$$

$$O(S_i, M_i)[n] = W(S_i, M_i)[n] - E(S_i, M_i)[n]$$

In various embodiments, the time offset of the master clock from the grandmaster clock that may be sent in the follow up packet by the master may be computed using the following equation:

$$\Theta(M_i, R_i)[n] = O(M_i, R_i)[n] - \frac{F(M_i, R_i)[N]\{t_3[n] - t_{last}(M_i)[n]\}}{\{2^{41} + F(M_i, R_i)[N]\}}$$

In various embodiments, the time offset between the slave clock and the grandmaster clock may be computed using the following equation:

$$O(S_i, R_i)[n] = O(S_i, M_i)[n] + \Theta(M_i, R_i)[n] - \frac{D(M_i, S_i)[n] F(M_i, R_i)[N]}{\{2^{41} + F(M_i, R_i)[N]\}}$$

Various computational techniques may also be used for inter-domain connections between an inter-domain master and an inter-domain slave connected by an inter-domain link for time sync packet exchanges.

In various embodiments, at the conclusion of inter-domain packet exchanges, an inter-domain slave may be configured to compute the value of the inter-domain timestamp using the formula:

$$t_{last\text{-}id}(S_i)[n] = t_{last}(S_i)[n] + O(S_i, R_i)[n] + \frac{(t_4[n] - t_{last}(S_i)[n])}{\left(1 + \frac{F(S_i, R_i)[N]}{2^{41}}\right)}$$

wherein the subscript i refers to the slave domain, the subscript j refers to the master domain, and the subscript g refers to the grandmaster domain. The timestamp $t_4[n]$ may refer to the value obtained at the conclusion of the inter-domain time sync exchange. The computed value of $t_{last\text{-}id}(S_i)[n]$ may be sent by the inter-domain slave node in the inter-domain timestamp packet.

In various embodiments, at the conclusion of every nth time sync packet exchange, the frequency ratio between the inter-domain master's local clock entity and the inter-domain slave's local clock entity may be computed using the equations:

$$f(S_i, M_j)[0] = 1$$

$$f(S_i, M_j)[1] = \frac{(t_1[1] - t_1[0])}{(t_2[1] - t_2[0])}$$

$$f(S_i, M_j)[N] =$$

$$f(S_i, M_j)[N-1] - \frac{f(S_i, M_j)[N-1]}{2^\alpha} + \frac{(t_1[N] - t_1[N-1])}{2^\alpha (t_2[N] - t_2[N-1])}$$

In various embodiments, the frequency offset between the inter-domain master's local clock entity and the inter-domain slave's local clock entity may be computed using the equations:

$$F(S_i, M_j)[N] = \{f(S_i, M_j)[N] - 1\} 2^{41}$$

In various embodiments, the frequency ratio between the root switch of a slave domain and the root switch of a grandmaster domain may be computed using the following equation:

$$f(R_i, R_g)[N] = \frac{f(S_i, M_j)[N] \left\{ 1 + \frac{F(M_j, R_j)[N]}{2^{41}} \right\} \left\{ 1 + \frac{F(R_j, R_g)[N]}{2^{41}} \right\}}{f(S_i, R_i)[N]}$$

In various embodiments, the frequency offset between the root switch of a slave domain and the root switch of a grandmaster domain may be computed using the following equation:

$$F(R_i, R_g)[N] = \{f(R_i, R_g)[N] - 1\} 2^{41}$$

At the conclusion of time sync packet exchanges, the mean propagation delay between an inter-domain slave and an inter-domain master may be computed using the following equation:

$$D(M_j, S_i)[0] = \frac{\{(t_4[0] - t_1[0]) - (t_3[0] - t_2[0])\}}{2}$$

$$D(M_j, S_i)[n] =$$

$$D(M_j, S_i)[n-1] - \frac{D(M_j, S_i)[n-1]}{2^\beta} + \frac{\left\{\frac{(t_4[n] - t_1[n])}{f(S_i, M_j)[N]}(t_3[n] - t_2[n])\right\}}{2^{(\beta+1)}}$$

At the conclusion of time sync packet exchanges, the time offset ($O(S_i, M_i)[n]$) between an inter-domain slave and an inter-domain master may be computed using the following equation:

$$W(S_i, M_j)[0] = \frac{(t_3[0] - t_4[0] + D(M_j, S_i)[0])}{2}$$

$$W(S_i, M_j)[n] =$$

$$W(S_i, M_j)[n-1] - \frac{W(S_i, M_j)[n-1]}{2^\gamma} + \frac{(t_3[n] - t_4[n] + D(M_j, S_i)[n])}{2^\gamma}$$

$$E(S_i, M_j)[n] = E(S_i, M_j)[n-1] - \frac{E(S_i, M_j)[n-1]}{2^\delta} +$$

$$\frac{(W(S_i, M_j)[n] - t_3[n] + t_4[n] - D(M_i, S_j)[n])}{2^\delta}$$

$$O(S_i, M_j)[n] = W(S_i, M_j)[n] - E(S_i, M_j)[n]$$

In various embodiments, the time offset of an inter-domain master clock ($M_j$) from the root switch clock ($R_j$) of its domain that may be sent in a follow up packet by the inter-domain master may be computed using the following equation:

$$\Theta(M_j, R_j)[n] = O(M_j, R_j)[n] - \frac{F(M_j, R_j)[N]\{t_3[n] - t_{last}(M_j)[n]\}}{\{2^{41} + F(M_j, R_j)[N]\}}$$

In various embodiments, the time offset of an inter-domain slave's clock ($S_i$) from the root switch clock of a master domain ($R_j$) may be computed using the following equation:

$$O(S_i, R_j)[n] = O(S_i, M_j)[n] + \Theta(M_j, R_j)[n] - \frac{D(M_j, S_j)[n]F(M_j, R_j)[N]}{\{2^{41} + F(M_j, R_j)[N]\}}$$

In various embodiments, the time offset of the root switch of a slave domain ($R_j$) and the root switch of a grandmaster domain ($R_g$) may be computed using the following equation:

$$O(R_i, R_g)[n] = O(S_i, R_j)[n] + O(R_j, R_g)[n] -$$

$$O(S_i, R_i)[n] + \frac{F(S_i, R_i)[N]\{t_4[n] - t_{last}(S_i)[n]\}}{\{2^{41} + F(S_i, R_i)[N]\}} -$$

$$\frac{F(R_j, R_g)[N]\{t_4[n] + O(S_i, R_j)[n] - t_{last-id}(M_j)[n]\}}{\{2^{41} + F(R_j, R_g)[N]\}}$$

wherein, in various embodiments, if the master domain j is the same as the grandmaster domain g, the values of $O(R_j, R_g)[n]$, $F(R_j, R_g)[N]$, and $t_{last-id}(M_i)[n]$ may be assumed to be 0

At any instant of time t, any switch ($S_i$) in a domain i may be capable of computing a grandmaster time $t_g$, using the following equations:

$$t_g = t_{last-id}(S_i)[n] + O(R_i, R_g)[n] +$$

$$\frac{\left\{t_{last}(S_i)[n] + O(S_i, R_i)[n] + \frac{(t - t_{last}(S_i)[n])}{\left(1 + \frac{F(S_i, R_i)[N]}{2^{41}}\right)} - t_{last-id}(S_i)[n]\right\}}{\left\{i + \frac{F(R_i, R_g)[N]}{2^{41}}\right\}}$$

wherein, in various embodiments, if the domain i is not slaved to any other domain the values of $t_{last-id}(S_i)[n]$, $O(R_i, R_g)[n]$, and $F(R_i, R_g)[N]$, and may be assumed to be 0.

Figure 27:
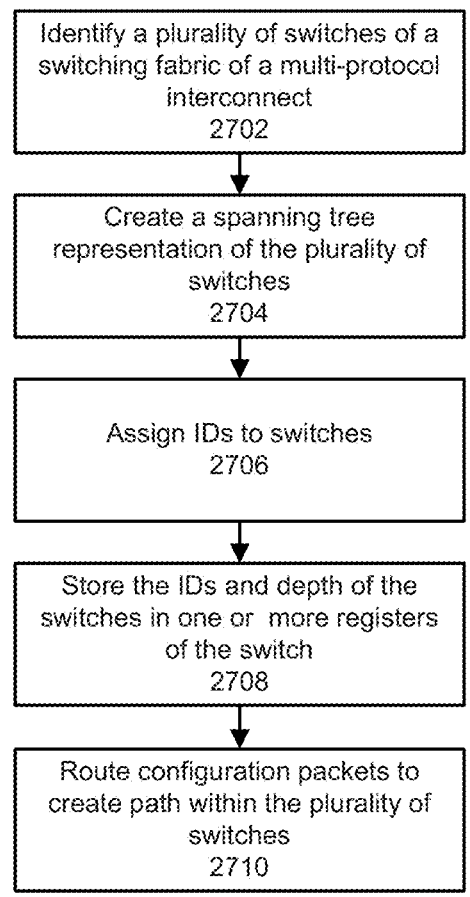
FIG. 27 is a flow diagram of a method for configuring a multi-protocol tunneling I/O interconnect, in accordance with various embodiments of the present disclosure.

FIG. 27 is a flow diagram of an example method 2700 for configuring a multi-protocol tunneling I/O interconnect, in accordance with various embodiments of the present disclosure. The method 2700 may include one or more functions, operations, or actions as is illustrated by blocks 2702-2710.

Processing for the method 2700 may start with block 2702 by identifying a plurality of switches of a switching fabric of a multi-protocol interconnect.

The method 2700 may proceed to block 2704 by creating a spanning tree representation of the plurality of switches.

The method 2700 may proceed to block 2706 by assigning unique identifications (IDs) to the switches of plurality of switches of the spanning tree. In various embodiments, the IDs may represent the relative positions of the switches within the spanning tree.

The method 2700 may proceed to block 2708 by storing the IDs and depth of the switches (in the spanning tree) in one or more registers of each of the switches.

The method 2700 may proceed to block 2710 by routing configuration packets through the spanning tree to the switches based at least in part on their respective IDs.

FIG. 28 illustrates an example method for operating a computer apparatus including a multi-protocol tunneling I/O interconnect, in accordance with various embodiments of the present disclosure. The method 2800 may include one or more functions, operations, or actions as is illustrated by blocks 2802-2822.

Processing for the method 2800 may start with block 2802 by determining whether a peripheral device has been plugged into a non-protocol-specific port of a computer apparatus including a multi-protocol tunneling I/O interconnect. Plugging may refer to a peripheral device being directly coupled with the non-protocol-specific port and/or a target peripheral device being directly coupled to some other peripheral device directly coupled with the non-protocol-specific port. In the latter embodiments, one or more other peripheral devices may be operatively disposed between the target peripheral device and the non-protocol-specific port. If no peripheral device has been plugged, then processing in block 2802 may repeat. In various embodiments, the computer apparatus may be configured to issue an interrupt signal indicating when a peripheral device has been plugged (e.g., hot-plugged).

Processing for the method 2800 may proceed to block 2804 by determining whether a data packet has been received. If no data packet has been received, then processing in block 2804 may repeat. In various embodiments, a data packet may be received from the peripheral device or from within the computer apparatus. In various embodiments, data packets within the computer apparatus may be received by the multi-protocol tunneling I/O interconnect from a protocol-specific controller ("host protocol-specific controller") of the computer apparatus.

Processing for the method 2800 may proceed to block 2806 by determining whether the data packet was received from the peripheral device or from a host protocol-specific controller. If no data packet has been received, then processing in block 2806 may repeat.

If the data packet was received from the peripheral device, processing for the method 2800 may proceed to block 2808 by encapsulating packets of a first protocol into first transport layer packets configured to be routed through the switching fabric of the I/O interconnect. In various embodiments, packets of a second protocol, different from the first protocol, may also be encapsulated into second transport layer packets for routing through the switching fabric.

Processing for the method 2800 may proceed to block 2810 by simultaneously routing the first and second transport layer packets through the switching fabric of the I/O interconnect.

Processing for the method 2800 may proceed to block 2812 by decapsulating the transport layer packets. In various embodiments, decapsulation may be performed an adapter port of a switch of the switching fabric.

Processing for the method 2800 may proceed to block 2814 by routing the decapsulated packets to different host protocol-specific controllers of the computer apparatus.

If the data packet was received from the peripheral device, processing for the method 2800 may proceed from block 2806 to block 2816 by encapsulating packets of a first protocol into first transport layer packets configured to be routed through the switching fabric of the I/O interconnect. In various embodiments, packets of a second protocol, different from the first protocol, may also be encapsulated into second transport layer packets for routing through the switching fabric.

Processing for the method 2800 may proceed to block 2818 by simultaneously routing the first and second transport layer packets through the switching fabric of the 110 interconnect.

Processing for the method 2800 may proceed to block 2820 by decapsulating the transport layer packets. In various embodiments, decapsulation may be performed an adapter port of a switch of the switching fabric.

Processing for the method 2800 may proceed to block 2822 by routing the decapsulated packets to a peripheral device via a non-protocol-specific port of the computer apparatus.

Figure 29:
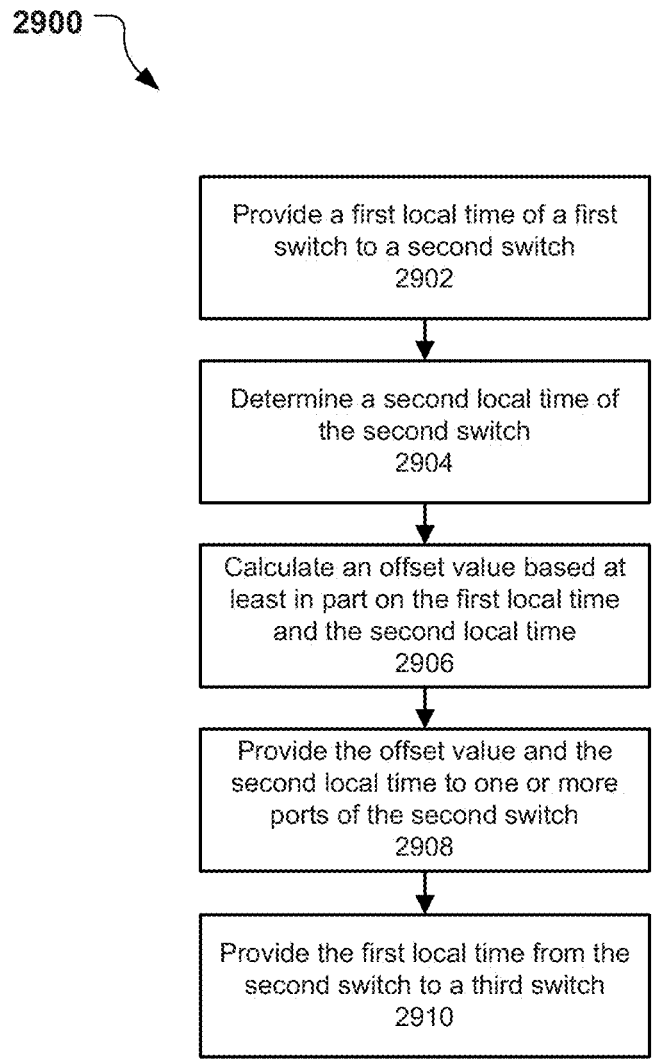
FIG. 29 is a flow diagram of a method for time synchronization of a multi-protocol interconnect, in accordance with various embodiments of the present disclosure FIG. 30 describes an article of manufacture having programming instructions configured to cause an apparatus to practice some or all aspects of multi-protocol tunneling (of the methods of FIGS. 27-29, for example), in accordance with embodiments of the present disclosure.

FIG. 29 illustrates an example method for time synchronization of a multi-protocol interconnect, in accordance with various embodiments of the present disclosure. The method 2900 may include one or more functions, operations, or actions as is illustrated by blocks 2902-2910.

Processing for the method 2900 may start with block 2902 by providing a first local time of a first switch of a switching fabric of a multi-protocol interconnect to a second switch of the switching fabric. In various embodiments, the first local time may be provided from a port of the first switch to a port of the second switch. In various embodiments, the switches may be in the same domain or different domains.

Processing for the method 2900 may proceed to block 2904 by determining a second local time of the second switch. In various embodiments, the second local time may be based at least in part on a timestamp of a free-running oscillator of the second switch.

Processing for the method 2900 may proceed to block 2906 by calculating an offset value based at least in part on the first local time and the second local time. In various embodiments, the offset value based at least in part on the timestamp of the free-running oscillator of the second switch and the first local time received from the first switch.

Processing for the method 2900 may proceed to block 2908 by providing the offset value and the second local time to one or more ports of the second switch.

Processing for the method 2900 may proceed to block 2910 by providing the first local time from the second switch to a third switch of the switching fabric. The third switch may be in the same domain as the first switch and/or the second switch or a different domain from either of the first switch and second switch. Although not shown, a third local time of the third switch may be adjusted to the first local time. For embodiments, in which the third switch is a slave switch within a second domain, the third switch may provide the first local time to a fourth switch in the second domain, and a fourth local time of the fourth switch may be adjusted to the first local time. The adjusted fourth local time may then be provided back to the third switch or another switch in the second domain for time synchronization.

Figure 30:
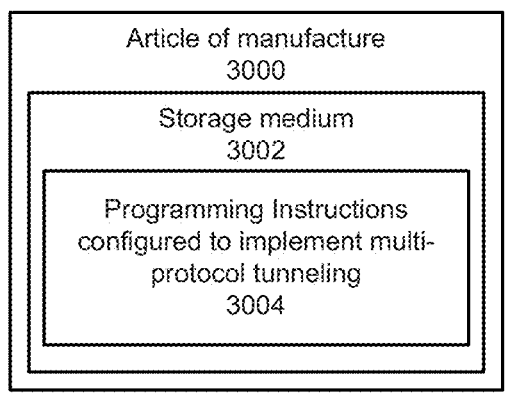

In various embodiments, an article of manufacture may be employed to implement one or more methods as disclosed herein. FIG. 30 describes an example article of manufacture 3000. As shown, the article of manufacture 3000 may include a computer-readable non-transitory storage medium 3002 and a storage medium 3002. The storage medium 3002 may include programming instructions 3004 configured to cause an apparatus to practice some or all aspects of multi-protocol tunneling, in accordance with embodiments of the present disclosure.

The storage medium 3002 may represent a broad range of persistent storage medium known in the art, including but not limited to flash memory, optical disks or magnetic disks. The programming instructions 3004, in particular, may enable an apparatus, in response to their execution by the apparatus, to perform various operations described herein. For example, the storage medium 3002 may include programming instructions 3004 configured to cause an apparatus to practice some or all aspects of multi-protocol tunneling of the methods of FIGS. 27-29, for example, in accordance with embodiments of the present disclosure.

Although various example methods, apparatus, systems, and articles of manufacture have been described herein, the scope of coverage of the present disclosure is not limited thereto. On the contrary, the present disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method for synchronizing time across a plurality of domains within a switching fabric of a multi-protocol interconnect, the method comprising:

providing, by a first switch of a first domain of the switching fabric, a first local time of the first switch to a second switch of the first domain;

adjusting, by the second switch, a second local time of the second switch to the first local time to cause the first and second switches within the first domain to be synchronized, the adjusting including calculating an offset value based at least in part on a timestamp received from the first switch, and adjusting the second local time by the offset value, wherein the offset value is calculated based on time asymmetry corrections between the transmit and receive paths for the timestamp using a time synchronization notification ordered set (TSNOS), the corrections indicating time delays between sending the timestamp with the TSNOS by the first switch and receiving the timestamp by the second switch, and sending a response to receipt of the timestamp by the second switch and receiving the response by the second switch, and a time duration between a first time instant when the timestamp is taken and a second time instant when a first bit of the TSNOS is transmitted or received;

providing, by the second switch, the first local time to a third switch of a second domain of the switching fabric; and adjusting, by the third switch, a third local time of the third switch to the first local time to cause the first and second switches of the first domain and the third switch of the second domain to be synchronized.

2. The method of claim 1, wherein the adjusting by the second switch comprises determining the second local time based at least in part on the timestamp of a free-running oscillator of the second switch.

3. The method of claim 2, further comprising providing the adjusted second local time from a first port of the second switch to a second port of the second switch.

4. The method of claim 1, wherein the providing the first local time to the second switch comprises providing the first local time from a first port of the first switch to a second port of the second switch.

5. The method of claim 1, wherein the providing the first local time to the second switch includes providing a frequency value of a free-running oscillator of the first switch to the second switch and wherein the method further comprises providing the frequency value from the second switch to the third switch.

6. The method of claim 1, further comprising providing the first local time from the third switch to a fourth switch of the second domain, and adjusting a fourth local time of the fourth switch to the first local time.

7. The method of claim 6, further comprising providing the adjusted fourth local time to the third switch, and adjusting a third local time of the third switch to the adjusted fourth local time.

8. The method of claim 6, further comprising providing the adjusted fourth local time to a fifth switch of the second domain, and adjusting a fifth local time of the fifth switch to the adjusted fourth local time.

9. A computer-readable non-transitory storage medium; and
a plurality of programming instructions for synchronizing time across a plurality of domains within a switching fabric of a multi-protocol interconnect stored in the storage medium, and configured to cause an apparatus, in response to execution of the programming instructions by the apparatus, to:
provide a first local time of a first switch of a first domain of the switching fabric to a second switch of the first domain of the switching fabric;
adjust a second local time of the second switch to the first local time to cause the first and second switches within the first domain to be synchronized, wherein to adjust includes to calculate an offset value based at least in part on a timestamp received from the first switch, and adjust the second local time by the offset value, wherein the offset value is calculated based on time asymmetry corrections between the transmit and receive paths for the timestamp using a time synchronization notification ordered set (TSNOS), the corrections indicating time delays between a transmission of the timestamp with the TSNOS by the first switch and a receipt of the timestamp by the second switch, and transmission of a response to receipt of the timestamp by the second switch and a receipt of the response by the second switch, and a time duration between a first time instant when the timestamp is taken and a second time instant when a first bit of the TSNOS is transmitted or received;
provide the first local time of the second switch to a third switch of a second domain of the switching fabric; and
adjust a third local time of the third switch to the first local time to cause the first and second switches of the first domain and the third switch of the second domain to be synchronized.

10. The computer-readable non-transitory storage medium article of of claim 9, wherein to adjust a second local time comprises to determine the second local time based at least in part on a timestamp of a free-running oscillator of the second switch.

11. The computer-readable non-transitory storage medium of claim 9, wherein to provide the first local time to the second switch comprises to provide the first local time from a first port of the first switch to a second port of the second switch.

12. A system for synchronizing time across a plurality of domains within a switching fabric of a multi-protocol interconnect, the system comprising:
an I/O complex including the multi-protocol interconnect having the switching fabric comprising a plurality of switches;
one or more processors operatively coupled with the I/O complex;
a non-transitory computer-readable storage medium operatively coupled with the one or more processors, and having stored therein a plurality of programming instructions configured to enable the system, in response to execution of the programming instructions, to:
provide a first local time of a first switch of a first domain of the switching fabric to a second switch of the first domain of the switching fabric;
adjust a second local time of the second switch to the first local time to cause the first and second switches within the first domain to be synchronized, wherein to adjust includes to calculate an offset value based at least in part on a timestamp received from the first switch, and adjust the second local time by the offset value, wherein the offset value is calculated based on time asymmetry corrections between the transmit and receive paths for the timestamp using a time synchronization notification ordered set (TSNOS), the corrections indicating time delays between a transmission of the timestamp with the TSNOS by the first switch and a receipt of the timestamp by the second switch, and transmission of a response to receipt of the timestamp by the second switch and a receipt of the response by the second switch, and a time duration between a first time instant when the timestamp is taken and a second time instant when a first bit of the TSNOS is transmitted or received;
provide the first local time of the second switch to a third switch of a second domain of the switching fabric; and
adjust a third local time of the third switch to the first local time to cause the first and second switches of the first domain and the third switch of the second domain to be synchronized; and
a display device operatively coupled to the I/O complex and the one or more processors.

13. The system of claim 12, wherein the system is a selected one of a desktop computer, a laptop computer, a handheld computer, a tablet computer, a netbook computer, a server, a set-top box, a digital reorder, a game console, a smart phone, a personal digital assistant, a mobile phone, a digital media player, or a digital camera.

14. The system of claim 12, further comprising one or more antennae operatively coupled to the I/O complex by the bus and configured to establish a wireless communication link with one or more components of a wireless network.

* * * * *